(12) United States Patent
Yoon et al.

(10) Patent No.: US 9,219,714 B2
(45) Date of Patent: Dec. 22, 2015

(54) ID-BASED ENCRYPTION AND SIGNATURE METHOD AND TERMINAL

(75) Inventors: Hyo Jin Yoon, Yongin-si (KR); Seon Young Lee, Seoul (KR); Tae Kyoung Kwon, Seoul (KR); Soo Yeon Shin, Seoul (KR); Jung Hee Cheon, Gwacheon-si (KR)

(73) Assignees: SAMSUNG SDS CO., LTD., Seoul (KR); SNU R&DB FOUNDATION, Seoul (KR)

(*) Notice: Subject to any disclaimer, the term of this patent is extended or adjusted under 35 U.S.C. 154(b) by 0 days.

(21) Appl. No.: 14/122,935

(22) PCT Filed: May 31, 2012

(86) PCT No.: PCT/KR2012/004328
§ 371 (c)(1),
(2), (4) Date: Apr. 1, 2014

(87) PCT Pub. No.: WO2012/165889
PCT Pub. Date: Dec. 6, 2012

(65) Prior Publication Data
US 2014/0208104 A1    Jul. 24, 2014

(30) Foreign Application Priority Data

May 31, 2011  (KR) .......................... 10-2011-0052474
Oct. 31, 2011  (KR) .......................... 10-2011-0112459

(51) Int. Cl.
*H04L 29/06*     (2006.01)
*H04L 9/30*      (2006.01)
*H04L 9/32*      (2006.01)

(52) U.S. Cl.
CPC .......... *H04L 63/0428* (2013.01); *H04L 9/3073* (2013.01); *H04L 9/3247* (2013.01); *H04L 63/0442* (2013.01); *H04L 63/126* (2013.01)

(58) Field of Classification Search
CPC . H04L 9/3073; H04L 9/3247; H04L 63/0428; H04L 63/126; H04L 63/0442
USPC ............ 380/44, 277, 278; 713/168, 171, 176, 713/156
See application file for complete search history.

(56) References Cited

U.S. PATENT DOCUMENTS 8,099,598 B1 *  1/2012  Liu ................................ 713/170
8,130,964 B2 *  3/2012  Boneh et al. .................. 380/278
(Continued)

FOREIGN PATENT DOCUMENTS

KR    10-2002-0083812 A    11/2002

OTHER PUBLICATIONS

Shamir, A., "Identity-based cryptosystems and signature schemes" Advances in Cryptology Crypto 1984, Lecture Notes in Computer Science 196 (1984), Springer, pp. 47-53.
(Continued)

*Primary Examiner* — Carl Colin
*Assistant Examiner* — Don Zhao
(74) *Attorney, Agent, or Firm* — Sughrue Mion, PLLC

(57) ABSTRACT

Provided are an identity (ID)-based encryption and signature method and a terminal that use an ID of a transmitter or a receiver as a part of the filename or the extension of a file transmitted to the receiver by the transmitter. Accordingly, it is possible to enable a user to visually recognize that the file has been provided with security. Also, it is possible to designate an associated program for the extension, and the user can easily decrypt or verify the file through the designated associated program.

47 Claims, 36 Drawing Sheets

(56) References Cited

U.S. PATENT DOCUMENTS

| | | | |
|---|---|---|---|
| 8,290,146 B2* | 10/2012 | Takashima | 380/28 |
| 2003/0081785 A1* | 5/2003 | Boneh et al. | 380/277 |
| 2004/0090466 A1* | 5/2004 | Loveria, III | 345/781 |
| 2004/0104097 A1* | 6/2004 | Ngee | 194/210 |
| 2004/0111642 A1* | 6/2004 | Peles | 713/201 |
| 2005/0246533 A1* | 11/2005 | Gentry | 713/170 |
| 2007/0041583 A1* | 2/2007 | Boneh et al. | 380/28 |
| 2009/0031128 A1* | 1/2009 | French et al. | 713/164 |
| 2010/0031042 A1* | 2/2010 | Di Crescenzo et al. | 713/169 |
| 2010/0208895 A1* | 8/2010 | Boneh et al. | 380/278 |
| 2011/0258430 A1* | 10/2011 | Luukkala et al. | 713/150 |
| 2012/0204032 A1* | 8/2012 | Wilkins et al. | 713/170 |
| 2012/0297189 A1* | 11/2012 | Hayton et al. | 713/165 |

OTHER PUBLICATIONS

Lee, Byoungcheon et al., "Secure Key Issuing in ID-based Cryptography", Proceedings of '04 Proceedings of the secured workshop on Australasian information security, Data Mining and Web Intelligence, and Software Internationalisation, vol. 32, pp. 69-74, 2004.
Gentry, Craig et al., "Hierarchical ID-Based Cryptography", Advances in Cryptography—ASIACRYPT 2002, Lecture Notes in Computer Science, Colume 2501, pp. 548-566, 2002.
International Search Report (PCT/ISA/210) dated Jan. 28, 2013, issued in International Application No. PCT/KR2012/004328.

* cited by examiner

FIG. 3A

| | FILENAME | | |
|---|---|---|---|
| | ORIGINAL FILENAME.<br>FILE EXTENSION | DISTING-<br>UISHER | .RECEIVER ID | .EXTENSION FOR<br>ENCRYPTION |

ENCRYPTION FILE FORMAT :

EXAMPLE OF ENCRYPTION FILE : notice.txt .id .bob .ibe

| | ORIGINAL FILENAME.<br>FILE EXTENSION | DISTING-<br>UISHER | .TRANSMITTER ID | .EXTENSION FOR<br>SIGNATURE |

SIGNATURE FILE FORMAT :

EXAMPLE OF SIGNATURE FILE : news.txt .id .alice .ibs

FIG. 3B

| HIERARCHICAL ENCRYPTION FILE FORMAT : | ORIGINAL FILENAME. FILE EXTENSION | DISTING-UISHER | .RECEIVER ID.RECEIVER GROUP ID | .EXTENSION FOR ENCRYPTION |
|---|---|---|---|---|
| EXAMPLE OF HIERARCHICAL ENCRYPTION FILE : | notice.txt | .id | .bob.marketing.samsung | .ibe |

| HIERARCHICAL SIGNATURE FILE FORMAT : | ORIGINAL FILENAME. FILE EXTENSION | DISTING-UISHER | .TRANSMITTER ID. TRANSMITTER GROUP ID | .EXTENSION FOR SIGNATURE |
|---|---|---|---|---|
| EXAMPLE OF HIERARCHICAL SIGNATURE FILE : | news.txt | .id | .alice.computer.sejong | .ibs |

←——— FILENAME ———→

FIG. 5

|   | File System | Maximum filename length | Original operating system |
|---|---|---|---|
| 1 | FAT32 | 8.3 (255 UTF-16 code units with LFN)[9] | Windows 95b[3] |
| 2 | NTFS | 255 characters | Windows XP (v. 5.1), Windows Vista (v. 6.0) |
| 3 | ext2 | 255 bytes | Linux, Hurd |
| 4 | ext3 | 255 bytes | Linux |
| 5 | XFS | 255 bytes[29] | IRIX, Linux, FreeBSD |
| 6 | BFS | 255 bytes | BeOS |
| 7 | ISO 9660:1988 | Level 1: 8.3, <br> Level 2 & 3: ~ 180 | MS-DOS, Mac OS, and AmigaOS |
| 8 | ISO 9660:1989 | Unknown (207?) | Microsoft Windows, Linux, Mac OS X, FreeBSD, and AmigaOS |

FIG. 19

```
content-type: multipart/mixed;
boundary="sample boundary"

This is a message with multiparts in MIME format.
--sample boundary
content-type: text/plain; charset="us-ascii"
content-transfer-encoding: Base64

This is the body of the message.
--sample boundary
content-disposition: attachment;
filename="notice.txt.id.Alice.computer.amu.ibs"
content-transfer-encoding: base64
content-type: application/ibs;
        name=""
notice.txt.id.Alice.computer.amu.ibs"
--sample boundary--
```

< TRANSMIT MESSAGE TOGETHER WITH ELECTRONIC SIGNATURE >

```
content-type: multipart/mixed;
boundary="sample boundary"

This is a message with multiparts in MIME format.
--sample boundary
content-type: application/ibe
content-transfer-encoding: Base64
content-disposition: attachment;
filename="notice.txt.id.Bob.marketing.samsung.ibe"

BE3......
--sample boundary
content-type: application/ibs;
content-disposition: attachment;
filename="notice.txt.id.Alice.computer.amu.ibs"
content-transfer-encoding: base64

ISGE......
--sample boundary--
```

< TRANSMIT MESSAGE TO WHICH ELECTRONIC SIGNATURE HAS BEEN PUT AND WHICH HAS BEEN ENCRYPTED > http://www.amu.ac.kr/school.jpg.id.amu.ibe http://www.amu.ac.kr/festival.avi.id.business.amu.ibe

< ACCESS ENCRYPTED FILE DB >

< BROADCAST OF FILE >

ID-BASED ENCRYPTION AND SIGNATURE METHOD AND TERMINAL

CROSS-REFERENCE TO RELATED APPLICATION

This application is a National Phase application under 35 U.S.C. §371 of International Application No. PCT/KR2012/004328, filed on May 31, 2012, which claims priority to and the benefit of Republic of Korea Patent Application Nos. 10-2011-0052474 filed on May 31, 2011 and 10-2011-0112459 filed on Oct. 31, 2011, the disclosure of which are incorporated herein by reference in its entirety.

BACKGROUND

The present disclosure relates to an identity-based (ID-based) encryption (IBE) and signature method and a terminal, and more particularly, to an ID-based encryption and signature method and a terminal that can distinguish between an encrypted file and a file to which a signature is appended.

In a secret-key-based cryptosystem, a file is encrypted and then transmitted on the assumption that a transmitter and a receiver have the same symmetric key. To transmit an encrypted file to a plurality of counterparts, a transmitter should have all symmetric keys corresponding to the respective counterparts. However, in an environment in which most pieces of data are shared online and run into astronomical figures, it is practically impossible for all people or devices to generate, share, store and manage the same symmetric key in order to encrypt and share a file. For this reason, an existing secret-key cryptosystem has a fundamental difficulty in managing users and keys that exponentially increase.

On the other hand, in a public key infrastructure (PKI) cryptosystem, asymmetric keys and a pair of a public key and a secret key are used. Since the PKI cryptosystem operates to set a secret key and calculate a public key from the secret key, a receiver side receiving an encrypted key cannot know whose secret key the secret key is with the public key alone. Thus, a relationship between user information, such as an accredited certificate, and a public key should be checked by an accredited certificate authority, and to this end, the accredited certificate authority issues a certificate to guarantee the relationship between the public key and an actual user. In other words, the PKI cryptosystem requires a certificate authority that issues and verifies an accredited certificate online, an accredited certificate including information on a public key, at least one directory in which the accredited certificate including the public key is stored, an accredited certificate management system, and so on.

SUMMARY

Exemplary embodiments of the present disclosure are directed to providing an identity (ID)-based encryption and signature method and a terminal that use a dedicated extension to encrypt a file or put a signature to the file using an ID of a transmitter or a receiver, such that the receiver can distinguish between the encrypted file and the file to which a signature has been appended.

The exemplary embodiments of the present disclosure are also directed to providing an ID-based encryption and signature method and a terminal that can use a distinguisher that makes it possible to distinguish between an ID used for encrypting a file or appending a signature to the file and the name of an original file.

According to an aspect of the present disclosure, there is provided a terminal including: an ID-based processing module configured to encrypt a file to be transmitted to a receiver or put an electronic signature to the file using a transmitter ID or a receiver ID.

According to another aspect of the present disclosure, there is provided a terminal including: an ID-based processing module configured to decrypt or verify a file using a transmitter ID or a receiver ID when the file a part of whose filename or whose extension is the transmitter ID or the receiver ID is received.

According to still another aspect of the present disclosure, there is provided an ID-based encryption and signature method including: encrypting a file to be transmitted to a receiver or putting an electronic signature to the file using a transmitter ID or a receiver ID.

According to yet another aspect of the present disclosure, there is provided a terminal including: an ID-based processing module configured to encrypt a file or put an electronic signature to the file using a part of a filename or an extension of the file to be transmitted to a receiver by a transmitter.

According to yet another aspect of the present disclosure, there is provided a terminal including: an ID-based processing module configured to decrypt or verify a file using a part of a filename or an extension of the file when the file which has been encrypted or to which an electronic signature has been put is received.

In at least one exemplary embodiment of the present disclosure, an ID used for ID-based encryption (IBE) is used as a filename, and a dedicated extension indicating encryption or signature is used, such that a user can visually recognize a file provided with security. Also, it is possible to designate an associated program for the extension, and the user can easily decrypt or verify the file through the designated associated program.

In addition, in at least one exemplary embodiment of the present disclosure, an ID used as a filename can be correctly distinguished using a distinguisher that makes it possible to distinguish between an ID used as a filename and a dedicated extension.

Furthermore, in at least one exemplary embodiment of the present disclosure, it is possible to encrypt/decrypt a file or append/verify an electronic signature even offline without using an accredited certificate used for key management in an existing PKI, a certificate authority certifying an accredited certificate, etc. after a secret key is issued except when an initial secret key is issued.

BRIEF DESCRIPTION OF DRAWINGS

FIG. 3A is a diagram showing formats of an encryption file and a signature file generated using one ID by a first ID-based processing module;

FIG. 3B is a diagram showing formats of a hierarchical encryption file and a hierarchical signature file generated using a plurality of IDs by the first ID-based processing module;

FIG. 5 is a table showing filename length limitations according to file systems;

FIG. 19 shows an example of a part of a message transmitted to the fourth terminal together with a signature file to which an electronic signature has been appended, and a part of a message transmitted to the fourth terminal together with a file to which encryption and electronic signature both is applied;

DETAILED DESCRIPTION

Figure 1:
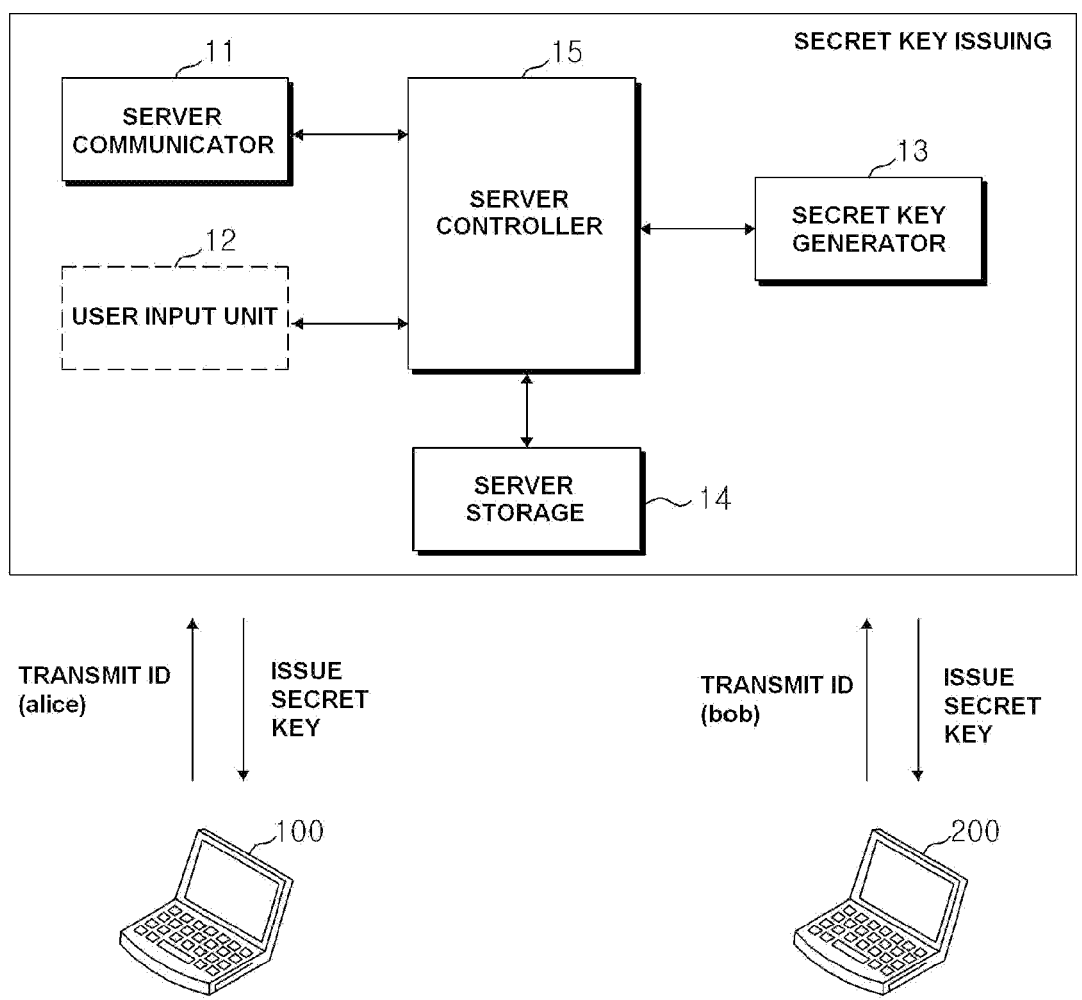
FIG. 1 is a diagram of an identity (ID)-based encryption and signature system according to an exemplary embodiment of the present disclosure.

These and other objects, features and advantages of the present disclosure will be readily appreciated from the following exemplary embodiments related to the accompanying drawings. However, the present disclosure is not limited to the exemplary embodiments described herein and may be embodied in other forms. Rather, the exemplary embodiments set forth herein are provided so that the disclosure will be thorough and complete, and will fully convey the scope of the present disclosure to those of ordinary skill in the art.

It will be understood that when an element is referred to as being "on" another element, it can be directly formed on the other element or intervening elements may be present.

It will be understood that, although the terms first, second, etc. may be used herein to describe elements and/or components, these elements and/or components should not be limited by these terms. These terms are only used to distinguish one element or component from another element or component. Embodiments described and exemplified herein include complementary embodiments thereof.

Also, it will be understood that, when a first element (or component) is referred to as being operated or executed "on" a second element (or component), the first element (or component) can be operated or executed in an environment where the second element (component) is operated or executed or can be operated or executed by interacting with the second element (component) directly or indirectly.

It will be understood that, when an element, component, apparatus, or system is referred to as comprising a component consisting of a program or software, the element, component, apparatus, or system can comprise hardware (e.g., a memory or a central processing unit (CPU)) necessary for executing or operating the program or software or another program or software (e.g., an operating system (OS) and a driver necessary for driving a hardware), unless the context clearly indicates otherwise.

Also, it will be understood that an element (component) can be implemented in the form of software, hardware, or software and hardware, unless the context clearly indicates otherwise.

The terms used herein are for the purpose of describing particular exemplary embodiments only and are not intended to be limiting the present disclosure. As used herein, singular forms are intended to include plural forms as well, unless the context clearly indicates otherwise. It will be further understood that the terms "comprises" and/or "comprising," when used herein, do not preclude the presence or addition of one or more other components.

Hereinafter, exemplary embodiments of the present disclosure will be described in detail with reference to drawings. In the description of particular embodiments below, various pieces of specifically defined content are provided to describe the present disclosure in further detail and assist in a comprehensive understanding of the present disclosure. However, it is apparent that the exemplary embodiments can be carried out by those of ordinary skill in the art without those specifically defined content. In the description of the exemplary embodiments, certain detailed explanations of related art are omitted when it is deemed that they may unnecessarily obscure the essence of the present disclosure.

FIG. 1 is a diagram of an identity (ID)-based encryption and signature system according to an exemplary embodiment of the present disclosure.

Referring to FIG. 1, an ID-based encryption and signature system includes a secret key issuing server 10, a first terminal 100, and a second terminal 200.

Each of the first terminal 100 and the second terminal 200 may request the secret key issuing server 10 to issue a secret key, encrypt or decrypt a file, and append an electronic signature to a file or verify an electronic signature. At a more general level, the performing of the just-mentioned operations with respect to a file, such as encryption of a file, decryption of a file, appending an electronic signature to a file, and verifying an electronic signature of a file, may be understood to constitute the implementing of file security measures. Likewise, encryption of a file and appending an electronic signature to a file may be thought of as pre-transmission file security measures while decryption of a file and verifying an electronic signature previously put to a file may be thought of as post-reception file security measures. It will be appreciated that an original file, to which one or more pre-transmission file security measures has been applied, may be thought of as a processed file. Likewise, a received processed file, to which one or more post-reception file security measures has been applied, may be thought of as a finished file. To transmit a file, the first terminal 100 and the second terminal 200 use an ID of a transmitter who transmits the file or an ID of a receiver who receives the file as a part of a filename or an extension of the file to transmit. Here, the transmitter ID and the receiver ID may both be understood to constitute examples of identifiers of terminal component ID's or, to put it another and more general way, examples of component ID's. In a similar fashion, the part of the filename and the extension of the file may be understood to constitute examples of various parts of a file identifier or, to put it another way, they are each at least a portion of a file identifier. In other words, to transmit a file, the first terminal 100 and the second terminal 200 according to an exemplary embodiment of the present disclosure may implement at least one pre-transmission file security measure with respect to a file (e.g., encrypt the file to transmit or put an electronic signature to the file) using at least a portion of a file identifier (e.g., a part of a filename or an extension) of the file to be transmitted from a transmitter to a receiver.

For example, the first terminal 100 and the second terminal 200 may include an ID-based processing module that requests the secret key issuing server 10 to issue a secret key, encrypts or decrypts a file, and appends an electronic signature to a file or verifies an electronic signature. Also, the ID-based processing module may use an ID of a transmitter who transmits a file or an ID of a receiver who receives the file as a part of a filename or an extension of the file to transmit. In other words, to transmit a file, the ID-based processing module may encrypt the file to transmit or put an electronic signature to the file using a part of a filename or an extension of the file to be transmitted from a transmitter to a receiver.

When the first terminal 100 and the second terminal 200 encrypt a file according to an exemplary embodiment of the present disclosure, they may include information indicating that the file is an encrypted file in a header of the encrypted file. Also, when the first terminal 100 and the second terminal 200 append an electronic signature to a file, they may include information indicating that the file is a file with an electronic signature in a header of the file with the electronic signature.

When the first terminal 100 and the second terminal 200 encrypt a file according to another exemplary embodiment of the present disclosure, they may include an extension indicating that the file is an encrypted file in the encrypted file. Also, when the first terminal 100 and the second terminal 200 append an electronic signature to a file, they may include an extension indicating that the file is a file with an electronic signature in the file with the electronic signature.

In the case of issuing a secret key, a user of the first terminal 100 may access the secret key issuing server 10 through a screen provided by the ID-based processing module, and receive a secret key paired with an ID of the user (e.g., "alice") from the secret key issuing server 10. Also, a user of the second terminal 200 may receive a secret key paired with an ID of the user (e.g., "bob") from the secret key issuing server 10.

An ID of a user may be created according to the user's intention or directly assigned by an administrator. For example, when the secret key issuing server 10 and the first terminal 100 are installed in a company, and the user of the first terminal 100 is a company employee, the administrator may assign at least one ID to the user according to an environment to which the user pertains, such as a personal ID utilizing an employee number, an email address, a telephone number, etc. of the user, a group ID utilizing a department, a position, etc. of the user, and so on. Thus, to determine an ID of a user according to an exemplary embodiment of the present disclosure, it is possible to use an ID of a user whose uniqueness has been already guaranteed by the ID itself, unlike in related art involving an accredited certificate authority. Such an ID of a user may include at least one of group IDs assigned to groups to which the user belongs and personal IDs assigned to the user only.

Operations by the ID-based processing module are performed in the same way in the first terminal 100 and the second terminal 200, and thus will be described below by taking the first terminal 100 as an example.

The secret key issuing server 10 according to an exemplary embodiment of the present disclosure may issue a secret key paired with an ID of a user. The ID of the user may be input from the first terminal 100 or the second terminal 200 by the user, or input through a user input unit 12 by an administrator who administers the secret key issuing server 10.

Such a secret key issuing server 10 includes a server communicator 11, the user input unit 12, a secret key generator 13, a server storage 14, and a server controller 15.

The server communicator 11 communicates with the first terminal 100 using a wired or wireless communication scheme. The server communicator 11 receives the ID of the user input by the user from the first terminal 100, and transmits a secret key paired with the ID of the user to the first terminal 100.

The user input unit 12 may receive the ID of the user and an address of the first terminal 100 input by the administrator, and a request for issue of a secret key corresponding to the input ID. The address of the first terminal 100 may be an Internet protocol (IP) address or a media access control (MAC) address.

When an ID of a user is input from the first terminal 100 through the server communicator 11, or input from the administrator through the user input unit 12, the secret key generator 13 generates a secret key paired with the input ID. When a plurality of IDs are input for one user, the secret key generator 13 may generate secret keys for the plurality of IDs, respectively.

The secret key generator 13 may generate the secret key paired with the ID of the user using an algorithm employed in an ID-based encryption (IBE) scheme. The IBE scheme may be used to encrypt a file or append an electronic signature to a file using an ID of a user like a public key of a public key infrastructure (PKI), and to decrypt a file or verify an electronic signature appended to a file. Since a user can intuitively identify an ID used in the IBE scheme with ease, the ID can be directly managed by the user, and does not require a PKI used in public key-based encryption (e.g., an accredited certificate and a certificate authority).

The server storage 14 may map the secret key generated by the secret key generator 13 to the ID of the user paired with the secret key and store the secret key with the ID of the user. The server storage 14 may further map the secret key and the ID of the user to the address of the first terminal 100 and store the secret key and the ID of the user with the address of the first terminal 100.

The server controller 15 may control the secret key generator 13 to generate a secret key for at least one ID of the user input through the server communicator 11 or the user input unit 12. The server controller 15 controls the server communicator 11 to transmit the secret key generated by the secret key generator 13 to the first terminal 100. When the ID of the user is input by the administrator, the server controller 15 controls the server communicator 11 to transmit the secret key to the first terminal 100 using the address of the terminal input by the administrator.

Figure 2:
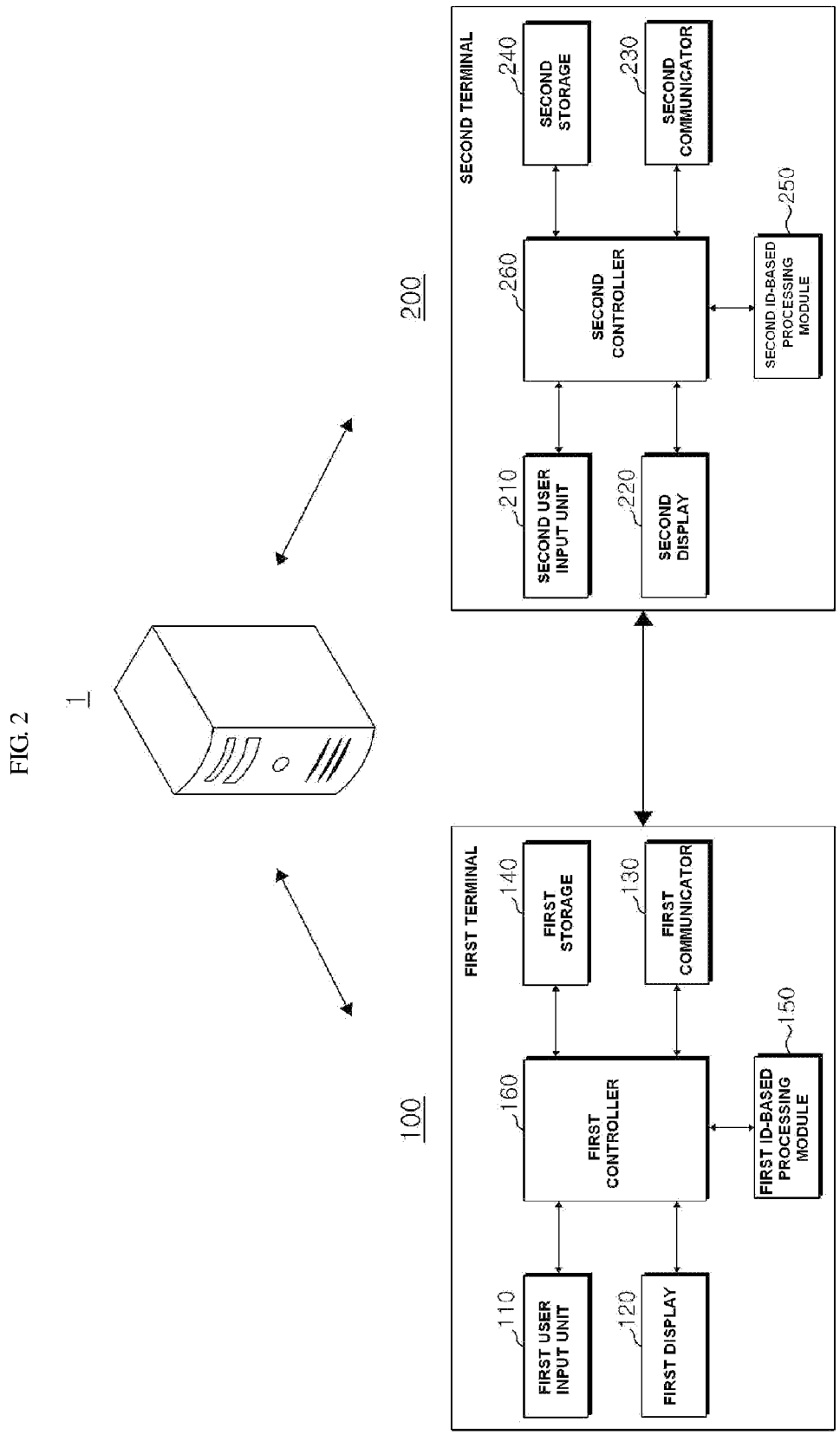
FIG. 2 is a block diagram showing a first terminal and a second terminal including an ID-based encryption and signature device according to an exemplary embodiment of the present disclosure.

When a local server 1 is established as in an exemplary embodiment of FIG. 2, the server controller 15 may transmit IDs of users for which secret keys have been generated to the local server 1.

When an exemplary embodiment of the present disclosure is applied to an intra-corporate system, a system management server that manages the intra-corporate system (e.g., the local server 1 of FIG. 2) may store IDs of corporate managers and employees and secret keys paired with the IDs. When a user requests provision of an ID of a certain employee, the system management server (not shown) may provide the ID (i.e., a public key) of the employee to the user, or provide an ID used in common by members of a group of the employee or respective unique IDs to the user. When the group denotes a whole company, the members may be all employees of the company. To this end, the system management server (not shown) should know information, such as IP addresses of terminals used by the managers and the employees, in advance.

FIG. 2 is a block diagram showing a first terminal and a second terminal including an ID-based encryption and signature device according to an exemplary embodiment of the present disclosure.

The first terminal 100 and the second terminal 200 can communicate via a local network. The local server 1 is shared by the first terminal 100 and the second terminal 200. For example, when an encryption file or a signature file generated by the first terminal 100 is stored in the local server 1, the user of the second terminal 200 may access the local server 1 and receive the encryption file or the signature file.

This embodiment has been described on the assumption that there is one second terminal 200, but the first terminal 100 may transmit an encryption file or a signature file to a plurality of receivers. In this case, when the encryption file or the signature file generated by the first terminal 100 is stored in the local server 1, a plurality of second terminals 200 may access the local server 1 and receive the encryption file or the signature file. In this specification, the second terminal 200 is referred to as receiving an encryption file or a signature file from the first terminal 100 when the second terminal 200 receives the encryption file or the signature file directly from the first terminal 100 or through a separately provided server, such as the local server 1.

By way of example, the first terminal 100 may put an electronic signature to a file using a secret key corresponding to a transmitter ID and then transmit the file to the local server 1, and each of at least one second terminal 200 may receive the file with the electronic signature from the local server 1 and verify the electronic signature.

Referring to FIG. 2, the first terminal 100 may include a first user input unit 110, a first display 120, a first communicator 130, a first storage 140, a first ID-based processing module 150, and a first controller 160. The user of the first terminal 100 is called a "first user," the user of the second terminal 200 is called a "second user," a file to be encrypted and transmitted from the first terminal 100 to the second terminal 200 is called a "first file," and a file to be transmitted from the first terminal 100 to the second terminal 200 after an electronic signature is appended thereto is called a "second file." Also, a file to be encrypted and transmitted from the second terminal 200 to the first terminal 100 is called a "third file," and a file to be transmitted from the second terminal 200 to the first terminal 100 after an electronic signature is appended thereto is called a "fourth file."

The first user input unit 110 provides an interface between the first terminal 100 and the first user, and may be, for example, a keyboard, a touch panel, or a mouse.

The first display 120 displays a screen related to operation or a state of the first terminal 100 or various screens generated by the first ID-based processing module 150 to the first user.

The first communicator 130 communicates with the secret key issuing server 10 or the second terminal 200 via a wireless communication network or a wireless communication network. The first communicator 130 may request issue of a secret key while transmitting an ID of the first user to the secret key issuing server 10, and may be issued with a secret key paired with the ID of the first user from the secret key issuing server 10. Also, the first communicator 130 may receive IDs of members of a group to which the first user belongs or external users from the system management server. The external users may be users related to the user in, for example, a social network.

In addition, the first communicator 130 communicates with the local server 1 to transmit an encryption file or a signature file generated by the first ID-based processing module 150 to the local server 1, or to receive an encryption file or a signature file generated by the second terminal 200 from the local server 1.

The first storage 140 may map the personal ID of the first user to the secret key paired with the personal ID and store the personal ID with the secret key, and map an ID of the group to which the first user belongs to a secret key paired with the group ID and store the group ID with the secret key. Also, the first storage 140 may store IDs of the external users who will exchange files or emails with the first user.

When the first ID-based processing module 150 applied as an ID-based encryption and signature device is installed in the first terminal 100, the first user may request the secret key issuing server 10 to issue a secret key through a screen provided by the first ID-based processing module 150.

The first ID-based processing module 150 may include a dedicated program that is an associated program of files having an extension for encryption (ibe) and an extension for signature (ibs) to be described later, or may operate in conjunction with the dedicated program. For example, the first ID-based processing module 150 itself may be configured in the form of the dedicated program (i.e., when the first ID-based processing module 150 is an associated program of files having the extension for encryption ibe and the extension for signature ibs), or the first ID-based processing module 150 may be configured to include the dedicated program or to be operated in conjunction with the dedicated program. Meanwhile, a second ID-based processing module 250 may also be configured in a similar fashion.

By way of example, when a file a part of whose filename or whose extension is a transmitter ID or a receiver ID is received, the second ID-based processing module 250 may decrypt the file or verify an electronic signature using the transmitter ID or the receiver ID. In other words, when an encryption file or a file with an electronic signature is received, the second ID-based processing module 250 may decrypt the encryption file or verify the electronic signature using a part of a filename or an extension of the encryption file or the file with the electronic signature. In an exemplary embodiment, the second ID-based processing module 250 may determine whether or not a file has been encrypted and/or an electronic signature has been put to the file when the second terminal 200 receives the file, and may extract a receiver ID from the filename or the extension of the received file and perform a decryption operation using a secret key corresponding to the extracted receiver ID when it is determined that the file has been encrypted. On the other hand, when it is determined that an electronic signature has been put to the file, the second ID-based processing module 250 may extract a transmitter ID from the filename or the extension of the received file and verify the electronic signature using the extracted transmitter ID as a public key.

An associated program can be set when an OS supported by the first terminal 100 is Windows series, but the OS is not limited to Windows series.

Using at least one of IDs of the first user, the secret key paired with the ID of the first user, an ID of the second user, and a secret key paired with the ID of the second user, the first ID-based processing module 150 may generate an encryption file or a signature file, and decrypt an encryption file or verify an electronic signature of a signature file.

More specifically, the first ID-based processing module 150 may encrypt a first file using an ID of a receiver (i.e., the second user) who will receive the first file as a public key, and generate and append an electronic signature to a second file using a secret key corresponding to an ID of a transmitter (i.e., the first user) who transmits the second file.

In an exemplary embodiment of the present disclosure, when encrypting a first file, the first ID-based processing module 150 may include information indicating that the first file is an encryption file in a header of the encryption file. Also, when appending an electronic signature to a second file, the first ID-based processing module 150 may include information indicating that the second file is a file with an electronic signature in a header of the file with the electronic signature. In such an exemplary embodiment, the second ID-based processing module 250 may determine whether a file received from the first terminal 100 or the local server 1 is an encryption file or a file with an electronic signature with reference to header information on the file. For example, when a file received from the first terminal 100 or the local server 1 is determined to be an encryption file with reference to header information, the second ID-based processing module 250 decrypts the encryption file using the secret key corresponding to the ID of the second user set in a filename of the encryption file, thereby outputting the first file. On the other hand, when a file received from the first terminal 100 or the local server 1 is determined to be a file with an electronic signature with reference to header information, the second ID-based processing module 250 may verify the electronic signature using the ID of the first user set in a filename of the signature file, thereby outputting the second file.

In another exemplary embodiment of the present disclosure, when encrypting a first file, the first ID-based processing module 150 may include information indicating that the first file is an encryption file in the encryption file. Also, when appending an electronic signature to a second file, the first ID-based processing module 150 may include information indicating that the second file is a file with an electronic signature in the file with the electronic signature. In such an exemplary embodiment, the second ID-based processing module 250 may determine whether a file received from the first terminal 100 or the local server 1 is an encryption file or a file with an electronic signature with reference to an extension of the file. For example, when a file received from the first terminal 100 or the local server 1 is determined to be an encryption file with reference to an extension of the file, the second ID-based processing module 250 decrypts the encryption file using the secret key corresponding to the ID of the second user set in a filename of the encryption file, thereby outputting the first file. On the other hand, when a file received from the first terminal 100 or the local server 1 is determined to be a file with an electronic signature with reference to header information, the second ID-based processing module 250 may verify the electronic signature using the ID of the first user set in a filename of the signature file, thereby outputting the second file.

When encrypting a first file, the first ID-based processing module 150 may include information indicating that the first file is an encryption file in a header of the encryption file. Also, when appending an electronic signature to a second file, the first ID-based processing module 150 may include information indicating that the second file is a file with an electronic signature in a header of the file with the electronic signature. In such an exemplary embodiment, the second ID-based processing module 250 may determine whether a file received from the first terminal 100 or the local server 1 is an encryption file or a file with an electronic signature with reference to header information on the file.

In still another exemplary embodiment of the present disclosure, the first terminal 100 may include information indicating that a file is an encryption file or a file with an electronic signature in a Multipurpose Internet Message Extensions (MIME) header. In such a case, a component that includes the information indicating that the file is an encryption file or a file with an electronic signature in the MIME header may be the first ID-based processing module 150 or a separately provided component (which will be described in detail with reference to FIG. 16). In such an exemplary embodiment, the second terminal 200 may determine whether the file received from the first terminal 100 or the local server 1 is an encryption file or a file with an electronic signature with reference to the MIME header of the file, and then perform a decryption operation or an operation of verifying the electronic signature.

Meanwhile, the exemplary embodiment of FIG. 2 is described assuming that the local server 1 has been established, but the scope of the present disclosure is not limited to such a case alone. For example, another exemplary embodiment of the present disclosure can be implemented without the local server 1. In this case, the first terminal 100 may receive an encryption file and/or an electronic signature file generated by the second terminal 200 directly from the second terminal 200, and the second terminal 200 may receive an encryption file and/or an electronic signature file generated by the first terminal 100 directly from the first terminal 100.

Alternatively, although the local server 1 has been established in the exemplary embodiment of FIG. 2, it is possible to establish a remote server connected via a wide area network (WAN) instead of the local server 1. A format used for the first ID-based processing module 150 to generate an encryption file and a signature file will be described below with reference to FIG. 3A and FIG. 3B.

FIG. 3A shows formats of an encryption file and a signature file generated using one ID by a first ID-based processing module.

Referring to FIG. 3A, an encryption file generated by the first ID-based processing module 150 may have a format including an original filename, a file extension, a distinguisher, a receiver ID, and an extension for encryption. A first file to be transmitted to a second user is finally encrypted by the first ID-based processing module 150, and thereby the encryption file is generated. The receiver ID is the ID of the second user who will receive the first file, denoting that the first ID-based processing module 150 has encrypted the first file using the receiver ID. The first file has the original filename and the file extension. The distinguisher may be used to distinguish between the original filename of the first file and the receiver ID used for encryption. The extension for encryption is a dedicated extension used for the second terminal 200 or the second user who is the receiver to easily identify the encryption file as an encrypted file.

Referring to an example of the encryption file shown in FIG. 3A, the first file is a text file (notice.txt) having the original filename "notice" and the file extension "txt," and an ID of the receiver is "bob." By way of example, the first ID-based processing module 150 uses "id" as the distinguisher and "ibe" as the extension for encryption, but the distinguisher and the extension for encryption are not limited to such an example.

In addition, a signature file generated by the first ID-based processing module 150 may have a format including an original filename, a file extension, a distinguisher, a transmitter ID, and an extension for signature. The signature file is a second file which will be transmitted to a second user and to which an electronic signature has been finally appended by the first ID-based processing module 150. The transmitter ID is an ID of a first user who transmits the second file, denoting that the first ID-based processing module 150 has generated and appended an electronic signature using a secret key paired with the transmitter ID. The second file has the original filename and the file extension. The distinguisher may be used to distinguish between the original filename of the second file and the transmitter ID used for the electronic signature. The extension for signature is a dedicated extension used for the second terminal 200 or the second user to easily identify the signature file as a file to which the electronic signature has been appended.

Referring to an example of the signature file shown in FIG. 3A, the second file is a text file (news.txt) having the original filename "news" and the file extension "txt," and an ID of the transmitter is "alice." By way of example, the first ID-based processing module 150 uses "id" as the distinguisher and "ibs" as the extension for signature.

FIG. 3B is a diagram showing formats of a hierarchical encryption file and a hierarchical signature file generated using a plurality of IDs by a first ID-based processing module.

Referring to FIG. 3B, a hierarchical encryption file generated by the first ID-based processing module 150 may have a format including an original filename, a file extension, a distinguisher, a plurality of receiver IDs, and the extension for encryption. In other words, the first ID-based processing module 150 may encrypt a first file using the plurality of receiver IDs, thereby generating the encryption file. The plurality of receiver IDs may be unique personal IDs of receivers and IDs of hierarchical groups to which receivers belong. In the case of FIG. 3B, the IDs of the receiver IDs used for encryption are "bob," "marketing," and "samsung." "bob" is a personal ID of a receiver, "marketing" is an ID of a marketing department, and "samsung" is an ID of a company to which a receiver belongs.

In addition, a hierarchical signature file generated by the first ID-based processing module 150 may have a format including an original filename, a file extension, a distinguisher, a plurality of transmitter IDs, and the extension for signature. In other words, the first ID-based processing module 150 may generate an electronic signature using the plurality of transmitter IDs, and then append the electronic signature to a second file, thereby generating the signature file. The plurality of transmitter IDs may be personal IDs of transmitters and IDs of hierarchical groups to which transmitters belong.

Referring to an example of the hierarchical signature file shown in FIG. 3B, transmitter IDs used to generate the electronic signature are "alice," "computer," and "amu." "alice" is a personal ID of a transmitter, "computer" is an ID of a computer group to which a transmitter belongs, and "amu" is an ID of a school to which a transmitter belongs An exemplary embodiment of FIG. 3A and FIG. 3B illustrate a case of using an extension indicating a file is an encrypted file and an extension indicating the file is a file with an electronic signature, but the scope of the present disclosure is not limited to such a case only. For example, an exemplary embodiment of the present disclosure may be configured such that information indicating that a file is an encrypted file is included in a header of the encrypted file, or information indicating that the file is a file with an electronic signature is included in a header of the file with an electronic signature.

Figure 4:
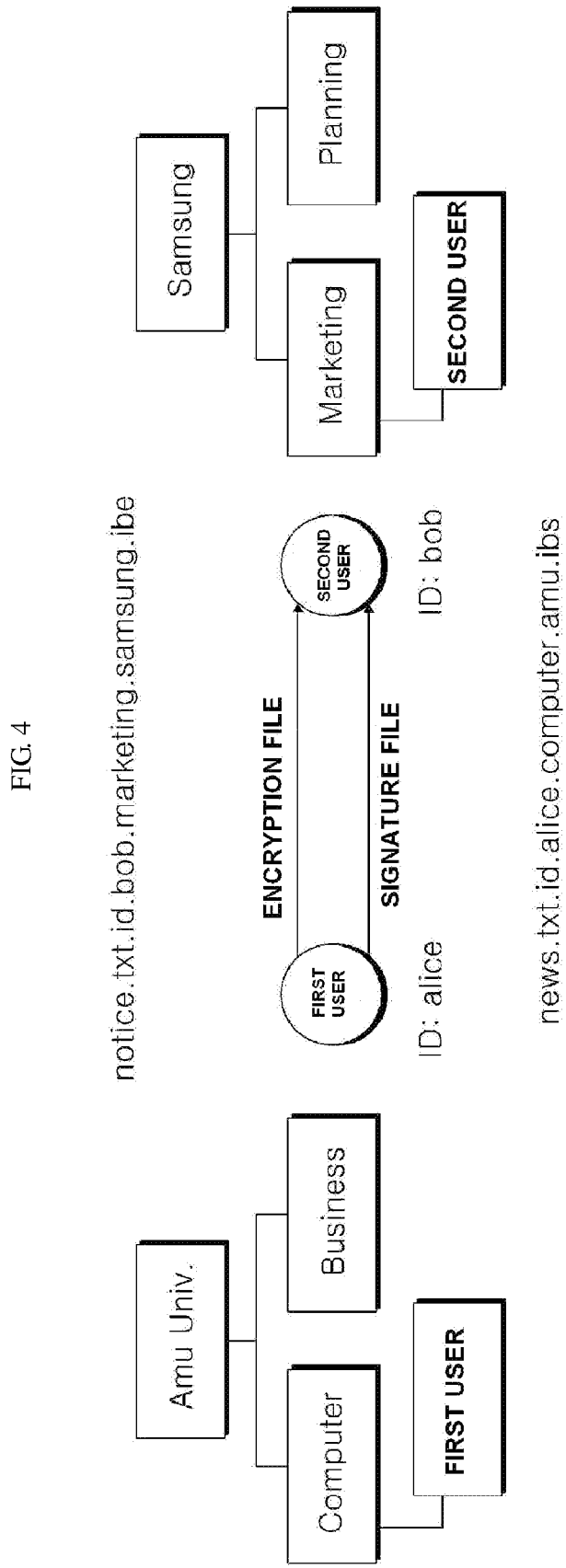
FIG. 4 is a diagram showing processes of generating an encryption file and a signature file using groups to which a first user and a second user respectively belong and IDs of the respective groups.

FIG. 4 is a diagram showing a series of processes of generating an encryption file and a signature file using groups to which a first user and a second user respectively belong and IDs of the respective groups are transmitted.

Referring to FIG. 4, an ID of a first user is "alice," and the uppermost-level group to which the first user belongs is "Amu university," whose ID is "amu." Amu university is classified into a computer group and a business group. An ID of the computer group is "computer," and that of the business group is "business." In the case of FIG. 4, the first user is a member of the computer group.

An ID of a second user is "bob," and uppermost-level group to which the second user belongs is "Samsung," whose ID is "samsung." Samsung is classified into a marketing department and a planning department, and IDs of the respective groups are "marketing" and "planning."

The first ID-based processing module 150 may encrypt a first file using the personal ID (bob) of the second user and the IDs (marketing and samsung) of the groups to which the second user belongs to generate an encryption file (notice.txt.id.bob.marketing.samsung.ibe), and enable the second user to receive the encryption file. Also, the first ID-based processing module 150 may generate an electronic signature using a secret key corresponding to the personal ID (alice) of the first user and secret keys corresponding to the IDs (computer and amu) of the groups to which the first user belongs and append the electronic signature to a second file to generate a signature file (news.txt.id.alice.computer.amu.ibs), and enable the second user to receive the signature file.

FIG. 5 shows examples of filename length limitations according to file systems.

Referring to FIG. 5, when a file system is New Technology File System (NTFS), the maximum length of a file name is 255 characters. For example, when a file system of the first terminal 100 is NTFS, the first ID-based processing module 150 may use the maximum of 255 characters as a filename excluding the extension for encryption from the format of an encryption file.

File systems shown in FIG. 5 are examples, and the scope of the present disclosure is not limited to them only.

Referring back to FIG. 2, the first controller 160 controls the overall operation of the first terminal 100 described above. For example, when the first user requests issue of a secret key corresponding to an ID of the first user, the first controller 160 controls the first communicator 130 to request issue of the secret key while transmitting the ID of the first user to the secret key issuing server 10.

When the secret key paired with the ID of the first user is issued by the secret key issuing server 10, or IDs of members of a group to which the first user belongs are received from the system management server, the first controller 160 controls the first storage 140 to store the secret key received from the secret key issuing server 10 or the IDs of members received from the system management server.

When an encryption file is generated by the first ID-based processing module 150 according to the IBE scheme, the first controller 160 stores the encryption file in the first storage 140, or controls the first communicator 130 to transmit the encryption file to a destination assigned by the first user. The destination may be the local server 1 sharable by the first terminal 100 and the second terminal 200, or the second terminal 200 capable of local communication with the first terminal 100.

When a file is received from the second terminal 200, the first controller 160 checks an extension (ibe or ibs) of the received file to determine whether an associated program has been set. When an associated program has been set, the first controller 160 executes the associated program, thereby causing the first ID-based processing module 150 to perform the corresponding operation (e.g., decryption of the file or verification of an electronic signature). It is possible to configure the first ID-based processing module 150 itself as an associated program, configure the first ID-based processing module 150 to include the associated program, or configure the first terminal 100 to include a separate associated program for operating the first ID-based processing module 150.

Operation of the first ID-based processing module 150 will be described in detail with reference to FIG. 6, FIG. 7, and FIG. 15.

Meanwhile, the second terminal 200 shown in FIG. 2 includes a second user input unit 210, a second display 220, a second communicator 230, a second storage 240, the second ID-based processing module 250, and a second controller 260. Operation of the second terminal 200 is almost the same as that of the first terminal 100, and detailed description thereof will be omitted.

However, the second storage 240 may store a secret key paired with the ID of the second user issued by the secret key issuing server 10, IDs of members of a group to which the second user belongs, and IDs of all external users (including the first user) who have requested issue of a secret key. The ID of the second user may include a personal ID for identifying the second user and at least one ID of a group to which the second user belongs.

When an encryption file having the extension for encryption or a signature file having the extension for signature is received, the second controller 260 or an OS may automatically execute a dedicated program designated as an associated program of the extension for encryption or the extension for signature, for example, the second ID-based processing module 250. When the received file is an encryption file, the second controller 260 delivers the encryption file to a second decryptor 255, and when the received file is a signature file, the second controller 260 delivers the signature file to a second electronic signature unit 254.

The second ID-based processing module 250 may decrypt an encryption file or verify an electronic signature of a signature file. More specifically, the second ID-based processing module 250 may encrypt a third file using an ID of a receiver (i.e., the first user) who will receive the third file, and generate and append an electronic signature to a fourth file using a secret key corresponding to an ID of a transmitter (i.e., the second user) who transmits the fourth file. The second ID-based processing module 250 may decrypt the encryption file using a secret key corresponding to the ID of the first user set in a filename of the encryption file to output the third file, and may verify the electronic signature using the ID of the second user set in a filename of the signature file to output the fourth file.

Figure 6:
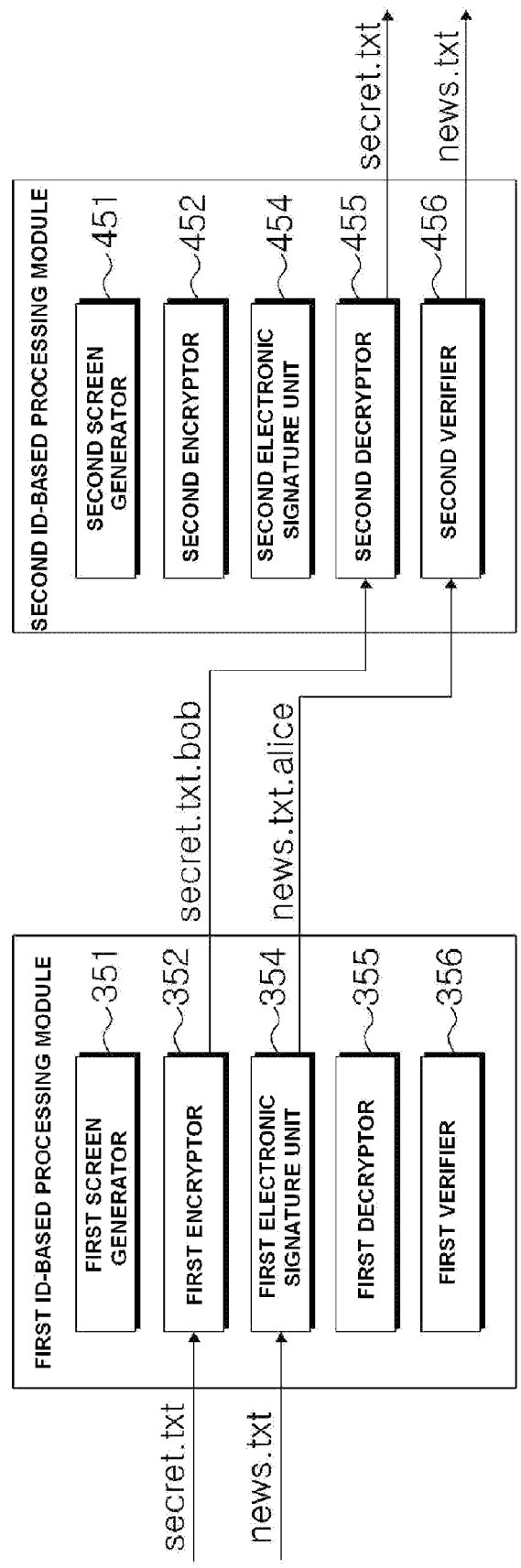
FIG. 6 is a block diagram of the first ID-based processing module and a second ID-based processing module according to an exemplary embodiment of the present disclosure.

FIG. 6 is a block diagram of a first ID-based processing module and a second ID-based processing module according to an exemplary embodiment of the present disclosure.

Referring to FIG. 6, the first ID-based processing module 150 includes a first screen generator 351, a first encryptor 352, a first decryptor 355, a first electronic signature unit 354, and a first verifier 356. From now, for convenience of description, a file to be transmitted from the first terminal 100 to the second terminal 200 will be called a "first file," and a file received from the second terminal 200 by the first terminal 100 will be called a "second file."

When the first user requests execution of a dedicated program for operating the first ID-based processing module 150, the first screen generator 351 may generate various screens for ID-based encryption and signature, such as FIG. 8 to FIG. 11.

Figure 8:
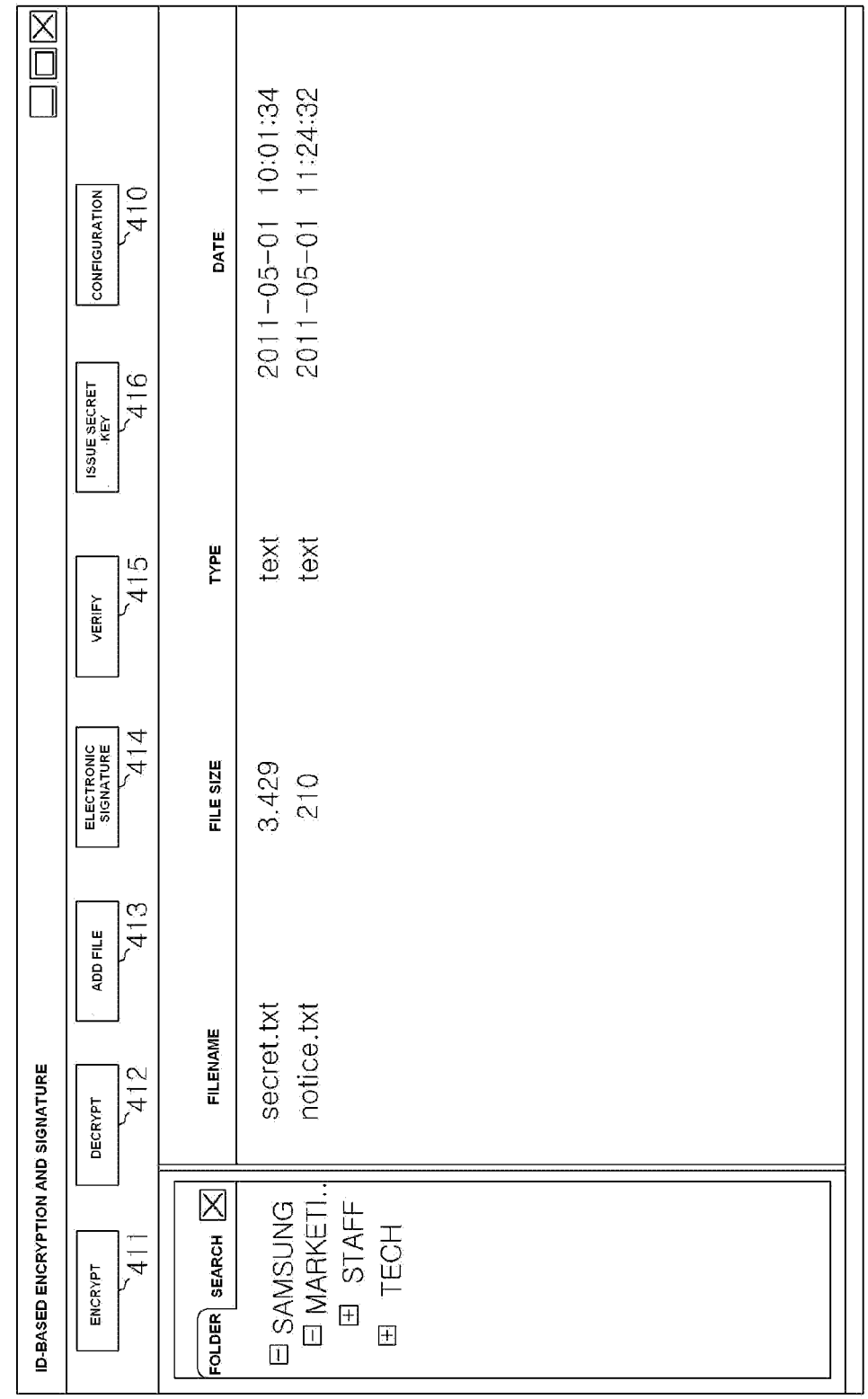
FIG. 8 shows a start-up screen for ID-based encryption and signature generated by a first screen generator.

FIG. 8 shows a start-up screen for ID-based encryption and signature generated by a first screen generator.

Referring to FIG. 8, a start-up screen 400 shows a configuration menu 410, an encrypt menu 411, a decrypt menu 412, an add-file menu 413, an electronic signature menu 414, a verify menu 415, and an issue-secret-key menu 416.

Figure 9:
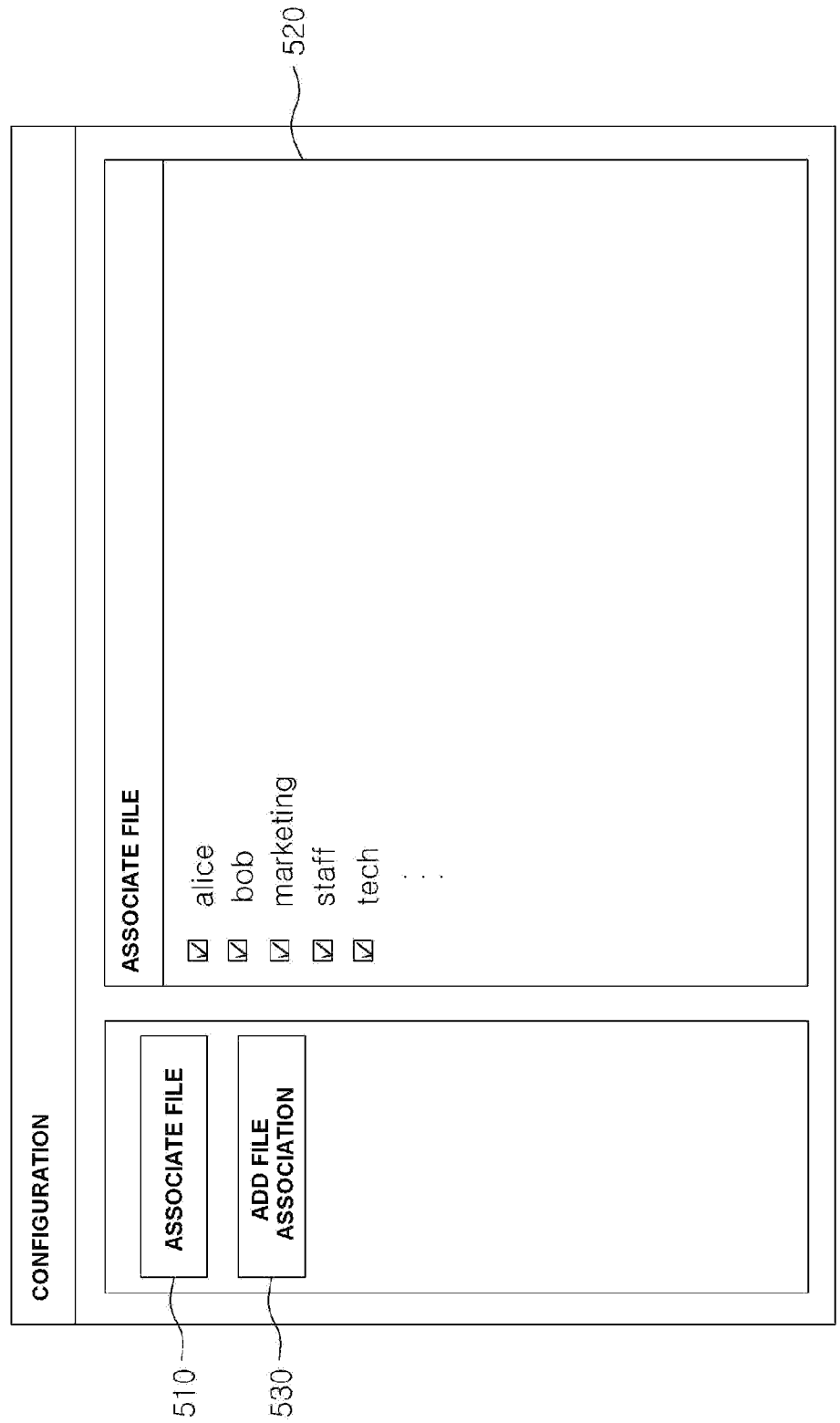
FIG. 9 shows a screen for configuring an ID-based processing module.

The configuration menu 410 is intended to add IDs of external users who will receive a first file, or delete IDs of external users that have been added already. When the first user selects the configuration menu 410, the first screen generator 351 generates a screen 500 for configuration as shown in FIG. 9.

When a file connection button 510 is selected by the first user in the configuration screen 500, the first screen generator 351 displays an ID list 520 of IDs of external users or IDs of groups for which the dedicated program has been set as an associated program. The first screen generator 351 may generate the ID list 520 using IDs of external users or IDs of groups that are received from the system management server (not shown) and stored in the first storage 140.

When an ID of an external user desired to be deleted is included in the ID list 520, the first user may click "√" corresponding to the ID of the external user to remove "√" When a second file having the ID from which "√" has been removed as an extension is received, the first ID-based processing module 150 may not verify an electronic signature of the second file because an extension of the received second file (i.e., the ID of the external user) is not in the ID list 520.

When an add-file-association button 530 is selected by the first user in the screen, the first screen generator 351 generates a screen through which an ID of a new external user can be input. When the first user inputs a new ID to the generated screen, the new ID is additionally displayed in the ID list 520 and registered with the first ID-based processing module 150 or the first storage 140.

Figure 10:
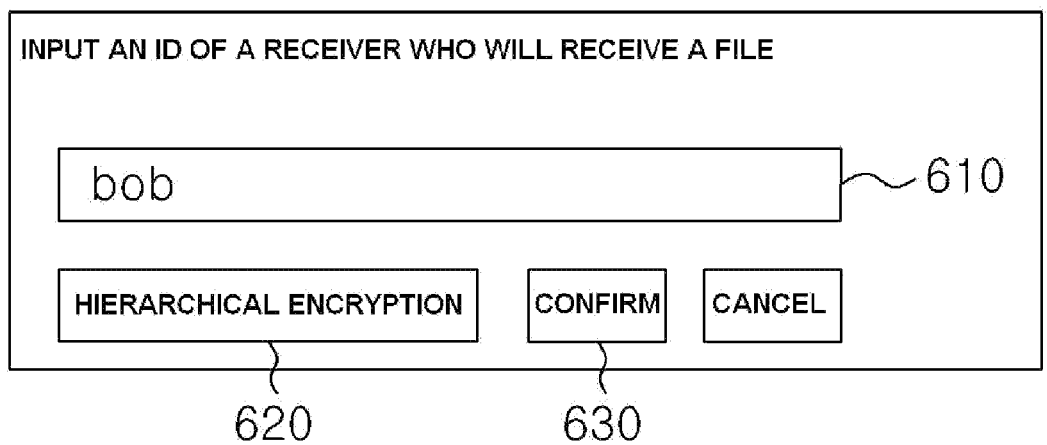
FIG. 10 shows a screen through which it is possible to input an ID of a second user who will receive a first file.

Using the encrypt menu 411 of FIG. 8, the first user requests encryption of a first file selected through "folder" or "search." When the first user selects the encrypt menu 411, the first screen generator 351 generates a screen 600 through which the ID of the second user who will receive the first file can be input as shown in FIG. 10. Operation related to screens 600 and 700 of FIG. 10 and FIG. 11 will be described in detail later with reference to the first encryptor 352.

The decrypt menu 412 is used to request decryption of the second file received from the second terminal 200.

The add-file menu 413 is used to request addition of a file to be encrypted.

The electronic signature menu 414 is used to request appending an electronic signature to a first file to be transmitted.

The verify menu 415 is used to request verification of the electronic signature appended to the second file received from the second terminal 200.

The issue-secret-key menu 416 is used to request the secret key issuing server 10 to issue the secret key corresponding to the ID of the first user. When the first user selects the issue-secret-key menu 416 after the first ID-based processing module 150 is installed and run, the first screen generator 351 generates a screen (not shown) through which the ID of the first user can be input. When the first user inputs the ID of the first user to the screen (not shown), the first terminal 100 may request issue of a secret key while transmitting the ID of the first user to the secret key issuing server 10, may be issued with a secret key paired with each ID, and may store the secret key.

Referring back to FIG. 6, the first encryptor 352 may encrypt a first file using at least one of the IDs displayed in the ID list 520 (i.e., stored in the first storage 140), and insert information indicating that the first file has been encrypted in a header of the encrypted first file. This is because the IDs displayed in the ID list 520 are IDs of external users or groups allowed to receive the first file encrypted by the first user. The first encryptor 352 encrypts the first file using a well-known IBE scheme.

First, an operation in which the first encryptor 352 encrypts the first file using one ID is described. When the first user selects the ID of the second user, the first encryptor 352 may encrypt the first file using the ID of the second user as a public key, and use the ID of the second user as an extension of the encrypted first file.

Next, an operation in which the first encryptor 352 hierarchically encrypts the first file using a plurality of IDs is described. Hierarchical encryption is a method of hierarchically encrypting the first file using IDs of a plurality of receivers. When the first user selects a plurality of IDs in sequence, the first encryptor 352 hierarchically encrypts the first file using the plurality of IDs in sequence, and uses the plurality of IDs as an extension of the first file. The plurality of IDs input in sequence may be an ID of an upper-level group to which receivers who will receive the first file and an ID of a lower-level group that is a child node of the upper-level group. Thus, the first encryptor 352 encrypts the first file using the ID of the lower-level group a first time, and then encrypts the first file using the ID of the upper-level group a second time. In other words, when a user selects IDs of a lower-level group and an upper-level group to which members belong so as to transmit the first file to the members of a group, the first encryptor 352 may encrypt the first file using the ID of the lower-level group selected first from between the IDs of the two groups as a public key, and encrypt the first file again using the later-selected ID of the upper-level group as a public key.

When the second file encrypted using the ID of the first user as a public key is received from the second terminal 200, the first decryptor 355 checks an extension of the second file. At this time, the first decryptor 355 may determine that the second file has been encrypted from information inserted in a header of the second file. When the checked extension is the ID of the first user, the first decryptor 355 decrypts the second file using a secret key paired with the ID of the first user.

When the electronic signature menu 414 displayed in the start-up screen 400 is selected, the first electronic signature unit 354 may generate an electronic signature of the first user using the secret key paired with the ID of the first user, and append the generated electronic signature to a first file. The first electronic signature unit 354 may use the ID of the first user as an extension of the first file to which the electronic signature has been appended, and insert information indicating that an electronic signature has been put to the first file in a header of the first file to which the electronic signature has been appended.

Needless to say, the first electronic signature unit 354 may append an electronic signature to a first file encrypted by the first encryptor 352. For example, when an encrypted first file is "secret.txt.bob," the first electronic signature unit 354 appends an electronic signature of the first user to "secret.txt.bob," and uses the ID of the first user in "secret.txt.bob" as an extension. Thus, the first file which has been encrypted and to which the electronic signature has been appended has the form "secret.txt.bob.alice."

When a second file using any one of the IDs of external users displayed in the ID list 520 as an extension is received from an external terminal, the first verifier 356 determines that an electronic signature has been appended to the second file from a header of the second file. Also, since the ID of an external user is used as the extension of the second file, the first user can visually determine that an electronic signature of an external user has been appended to the second file. When the extension of the second file is included in the ID list 520, the dedicated program may be automatically executed, and the first verifier 356 may verify the electronic signature using a verification algorithm.

Referring back to FIG. 6, the second ID-based processing module 250 includes a second screen generator 451, a second encryptor 452, a second decryptor 455, a second electronic signature unit 454, and a second verifier 456. The second screen generator 451, the second encryptor 452, the second decryptor 455, the second electronic signature unit 454, and the second verifier 456 of the second ID-based processing module 250 operate in the same way as the first screen generator 351, the first encryptor 352, the first decryptor 355, the first electronic signature unit 354, and the first verifier 356 of the first ID-based processing module 150, and detailed description thereof will be omitted.

The second storage 240 stores a secret key that is issued by the secret key issuing server 10 and paired with the ID of the second user, and may optionally store IDs of members of a group to which the second user belongs and IDs of all external users who have requested issue of a secret key, all the IDs being received from the system management server (not shown). The ID of the second user may include a personal ID for identifying the second user and at least one ID of a group to which the second user belongs.

When a first file having at least one of the IDs stored in the second storage 240 as an extension is received, the second controller 260 executes a dedicated program designated as an associated program of the extension. When the dedicated program is executed, the second ID-based processing module 250 may determine whether or not the first file has been encrypted or an electronic signature has been appended to the first file by checking a header of the first file.

Figure 11:
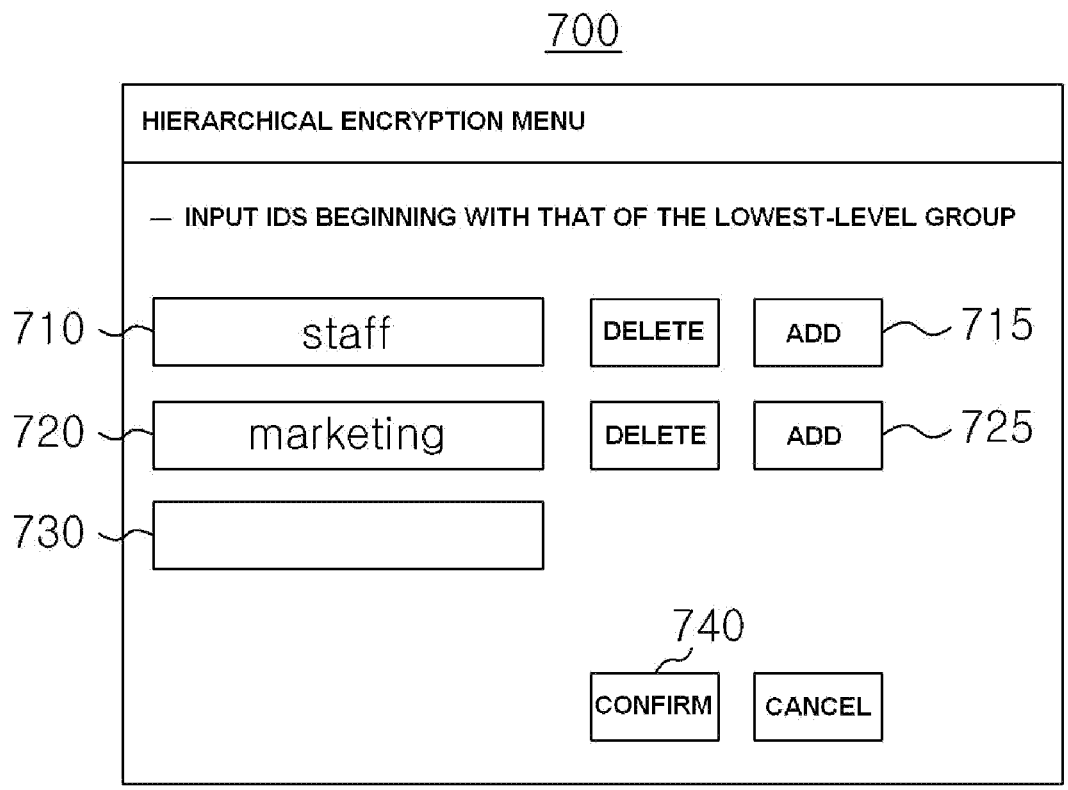
FIG. 11 shows a screen through which it is possible to input a plurality of IDs for hierarchical encryption.

When a dedicated program for operating the second ID-based processing module 250 is run, the second screen generator 451 may generate a start-up screen that is the same as or similar to FIG. 8, and generate various screens, such as FIG. 9 to FIG. 11, according to a user request.

When the second user selects a second file to transmit to the first user and selects an ID of the first user through a screen, such as FIG. 10, the second encryptor 452 may encrypt the second file using the ID of the first user as a public key, and use the ID of the first user s an extension of the encrypted second file.

When it is determined that a first file received from the first terminal 100 has been encrypted from information inserted in a header of the first file, the second decryptor 455 checks an ID of the second user used as an extension of the first file. The second user may find that the first file has been encrypted from the visually checked extension of the first file. The second decryptor 455 decrypts the first file using a secret key paired with the checked ID of the second user. The secret key paired with the ID of the second user may have been issued by the secret key issuing server 10 and stored in the second storage 240 in advance.

When it is determined that the first file has not been encrypted from the information inserted in the header of the first file, the second decryptor 455 may output the first file to the second verifier 456.

The second electronic signature unit 454 may generate an electronic signature of the second user using the secret key paired with the ID of the second user, and append the electronic signature to a second file.

When it is determined that an electronic signature has been appended to the first file from the information inserted in the header of the first file received from the first terminal 100, the second verifier 456 checks an ID of the first user used as an extension of the first file. The second user may determine who is a transmitter of the first file from the visually checked extension of the first file. The second verifier 456 may verify the validity of the electronic signature using the checked ID of the first user and an ID of the first user stored in the second storage 240. At this time, since the ID of the first user is included in the second storage 240, the dedicated program is automatically executed, and the second verifier 456 may verify the electronic signature using a verification algorithm.

Encryption, decryption, and appending and verification of an electronic signature according to the exemplary embodiment of FIG. 6 will be described in further detail below with reference to FIG. 12 to FIG. 14.

Figure 12:
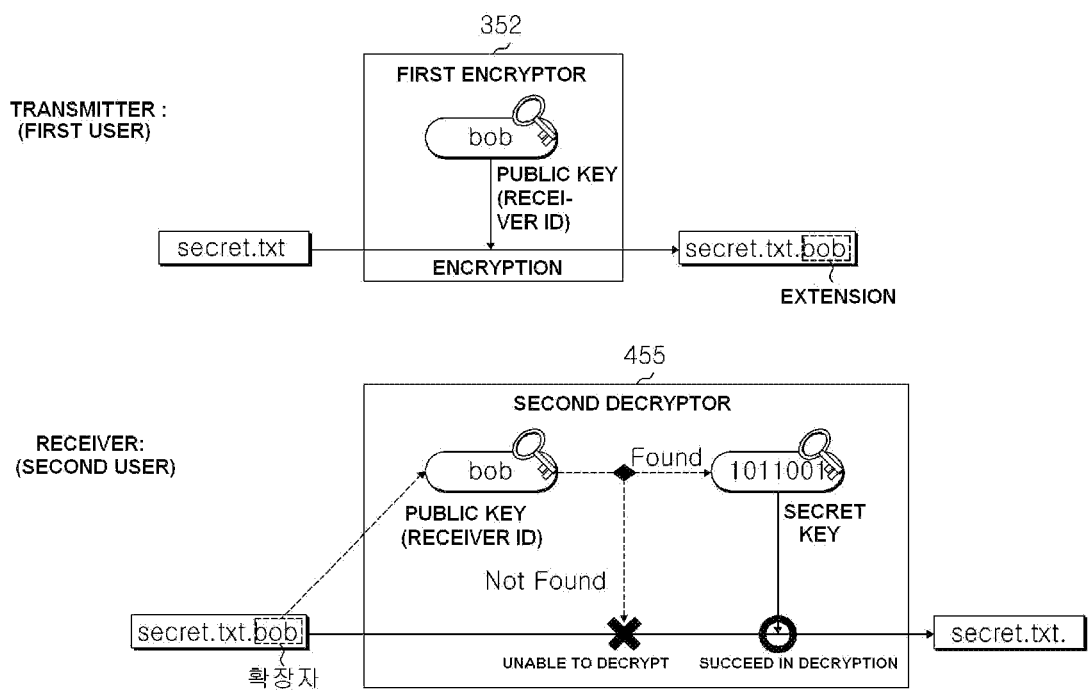
FIG. 12 is a diagram illustrating an example in which a first encryptor encrypts a first file using one ID, and a second decryptor decrypts the first file.

FIG. 12 is a diagram illustrating an example in which a first encryptor encrypts a first file using one ID, and a second decryptor decrypts the first file.

Referring to FIG. 8, FIG. 10, and FIG. 12, when the first user selects "secret.txt" as a first file to encrypt and then selects the encrypt menu 411 in the start-up screen 400, the first screen generator 351 generates the screen 600 through which the ID of the second user who will receive the first file can be input. When the first user inputs "bob" that is the ID of the second user to an ID input area 610 and then selects the a confirm button, the first encryptor 352 encrypts the first file using the ID of the second user selected by the first user as a public key. The first encryptor 352 uses the ID of the second user as an extension of the encrypted first file. Thus, the first file encrypted by the first encryptor 352 has the form "secret.txt.bob."

The second terminal 200 receiving the first file recognizes "bob" in "secret.txt.bob" as an extension, and executes a dedicated program designated as an associated program of "bob." The second ID-based processing module 250 or the second decryptor 455 determines that the first file has been encrypted from information inserted in a header of the first file. Since the extension "bob" in "secret.txt.bob" is the same as the ID of the second user, the second decryptor 455 decrypts "secret.txt.bob" using the secret key paired with the ID of the second user. When the decryption succeeds, the second decryptor 455 outputs the first file "secret.txt." When the secret key paired with the ID of the second user is not in the second terminal 200, the decryption fails.

Figure 13:
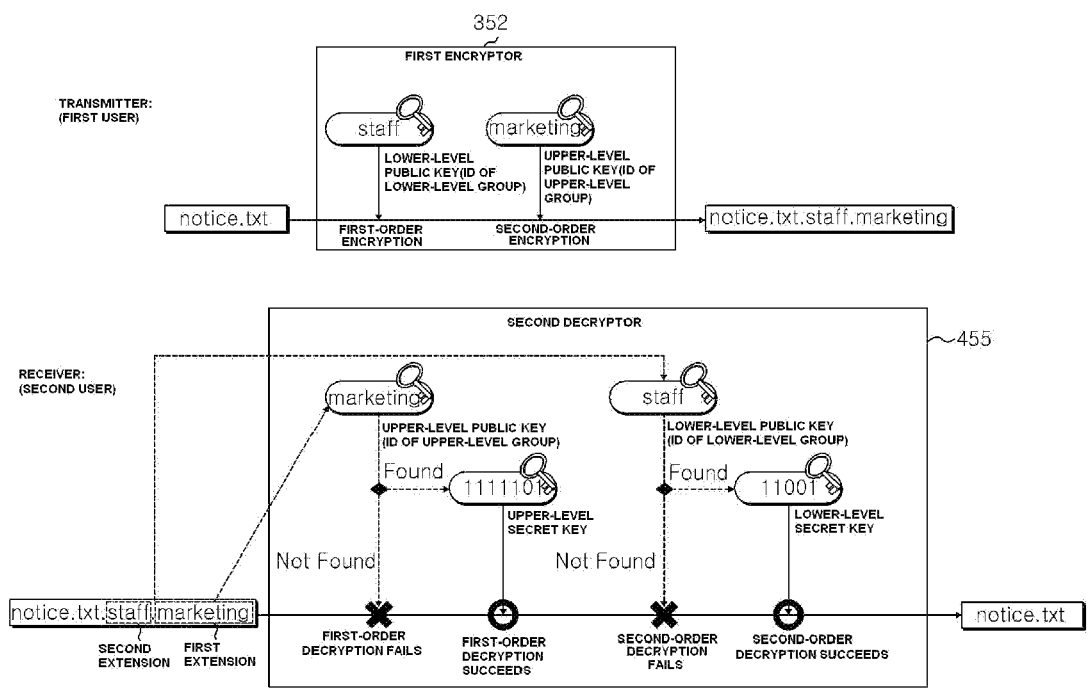
FIG. 13 is a diagram illustrating another example in which the first encryptor hierarchically encrypts a first file using two IDs, and the second decryptor hierarchically decrypts the first file.

FIG. 13 is a diagram illustrating another example in which a first encryptor hierarchically encrypts a first file using two IDs, and a second decryptor hierarchically decrypts the first file.

Referring to FIG. 10, FIG. 11, and FIG. 13, when the first user selects a hierarchical encryption button 620 for a first file "notice.txt" in the screen 600, the first screen generator 351 generates the screen 700 through which a plurality of IDs can be input as shown in FIG. 11. When the first user tries to transmit the first file to the staff of a marketing department, the first user inputs the ID "staff" of a group consisting of the staff of the marketing department in an ID input area 710, and inputs the ID "marketing" of the group "marketing" in an ID input area 720. When there is a lower-level group than the staff group, the first user may select an add button 715 to display an area (not shown) in which the lower-level group can be input. Also, when there is an upper-level group than the marketing group, the first user may select an add button 725 to display an area 730 in which an ID of the upper-level group can be input. When the first user selects a confirm button 740, the first encryptor 352 may encrypt the first file a first time using the first-input ID "staff" as a lower-level public key, and encrypt the first file a second time using "marketing" as an upper-level public key. Thus, the first file encrypted by the first encryptor 352 has the form "notice.txt.staff.marketing."

The second terminal 200 receiving the first file recognizes "marketing" in "notice.txt.staff.marketing" as an extension, and executes a dedicated program designated as an associated program of "marketing." The second ID-based processing module 250 or the second decryptor 455 determines that the first file has been encrypted from information inserted in a header of the first file. When the extension "marketing" in "notice.txt.staff.marketing" is the same as the ID of the upper-level group to which the second user belongs, the second decryptor 455 decrypts "notice.txt.staff.marketing" a first time using a secret key paired with the ID of the upper-level group. Also, when the extension "staff" in the first-order-decrypted file "notice.txt.staff" is the same as the ID of the lower-level group to which the second user belongs, the second decryptor 455 decrypts "notice.txt.staff" a second time using a secret key paired with the ID of the lower-level group. When both the first decryption and the second decryption succeed, the second decryptor 455 outputs the first file "notice.txt." When the secret keys paired with the IDs "marketing" and "staff" of the second user are not in the second terminal 200, the decryption fails.

Figure 14:
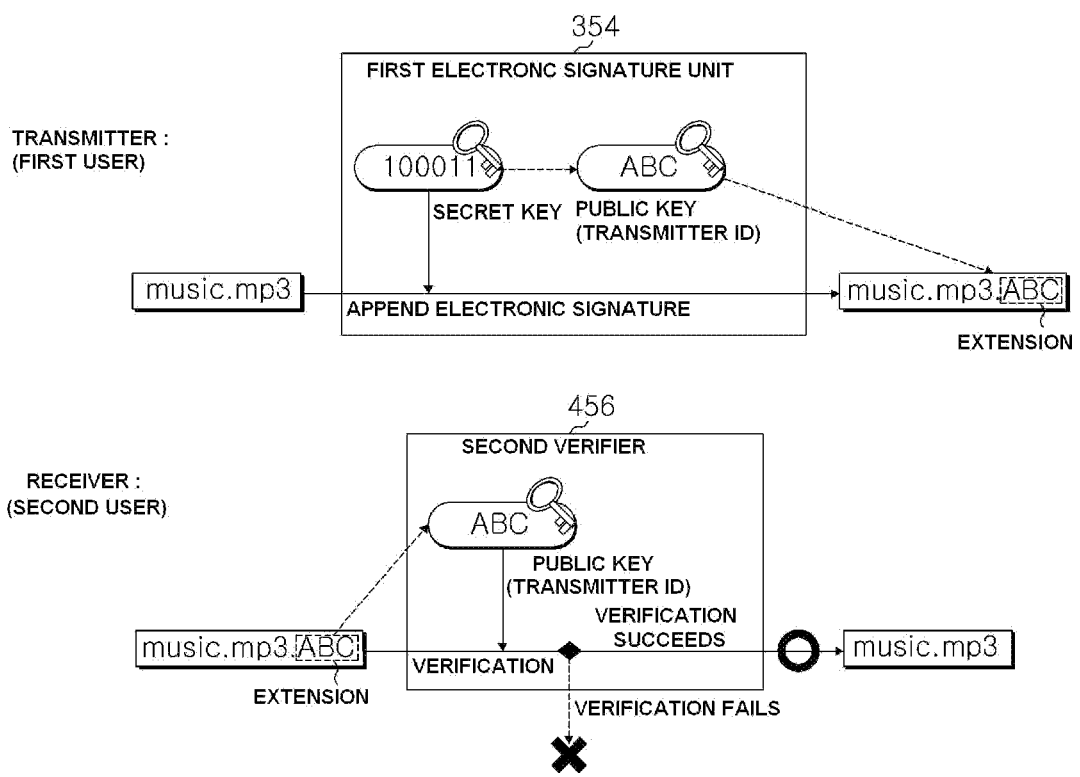
FIG. 14 is a diagram illustrating an example in which a first electronic signature unit appends an electronic signature to a first file using an ID of a first user, and a second verification unit verifies the validity of the electronic signature appended to the first file.

FIG. 14 is a diagram illustrating an example in which a first electronic signature unit appends an electronic signature to a first file using an ID of a first user, and a second verification unit verifies the validity of the electronic signature appended to the first file.

Referring to FIG. 14, assuming that the first terminal 100 is a server of the company "ABC" providing the sound source file "music.mp3," the first terminal 100 may not distribute the sound source file as the original is, but may distribute the sound source file in the form of "music.mp3.ABC" to which an electronic signature has been appended. In other words, the first electronic signature unit 354 may generate an electronic signature using a secret key paired with the ID "ABC" of the company, append the electronic signature to "music.mp3," and generate "music.mp3.ABC" using "ABC" as an extension of "music.mp3."

Subsequently, the second user of the second terminal 200 may download the sound source file "music.mp3" through a search. When the second user tries to download the sound source file of the company "ABC," it is possible to know that "music.mp3" is provided by ABC company from the file "music.mp3.ABC." Thus, when the second user thinks that sound source files of ABC company are superior in terms of sound quality and safe, the second user may download the sound source file with just a glance at the filename "music.mp3.ABC." The second terminal 200 receiving "music.mp3.ABC" recognizes "ABC" in "music.mp3.ABC" as an extension, and executes a dedicated program designated as an associated program of "ABC." The second ID-based processing module 250 or the second verifier 456 determines that an electronic signature has been appended to the sound source file from information inserted in a header of the sound source file. Since the extension "ABC" of "music.mp3.ABC" is the same as the ID of the first user stored in the second storage 240, the second verifier 456 verifies the validity of the electronic signature using the stored ID "ABC" of the first user and the extension "ABC" designated for the sound source file. When the verification succeeds, the second verifier 456 outputs the file "music.mp3."

When a malicious company does not have the secret key of ABC company, the malicious company may set an extension of a file to "ABC" as if a file of ABC company, and distribute the file. The second terminal 200 that downloads the file without knowing this fails in verification, and thus the second user can discard the downloaded file to prevent a danger such as virus. FIG. 7 is a block diagram of a first ID-based processing module and a second ID-based processing module according to another exemplary embodiment of the present disclosure.

Figure 7:
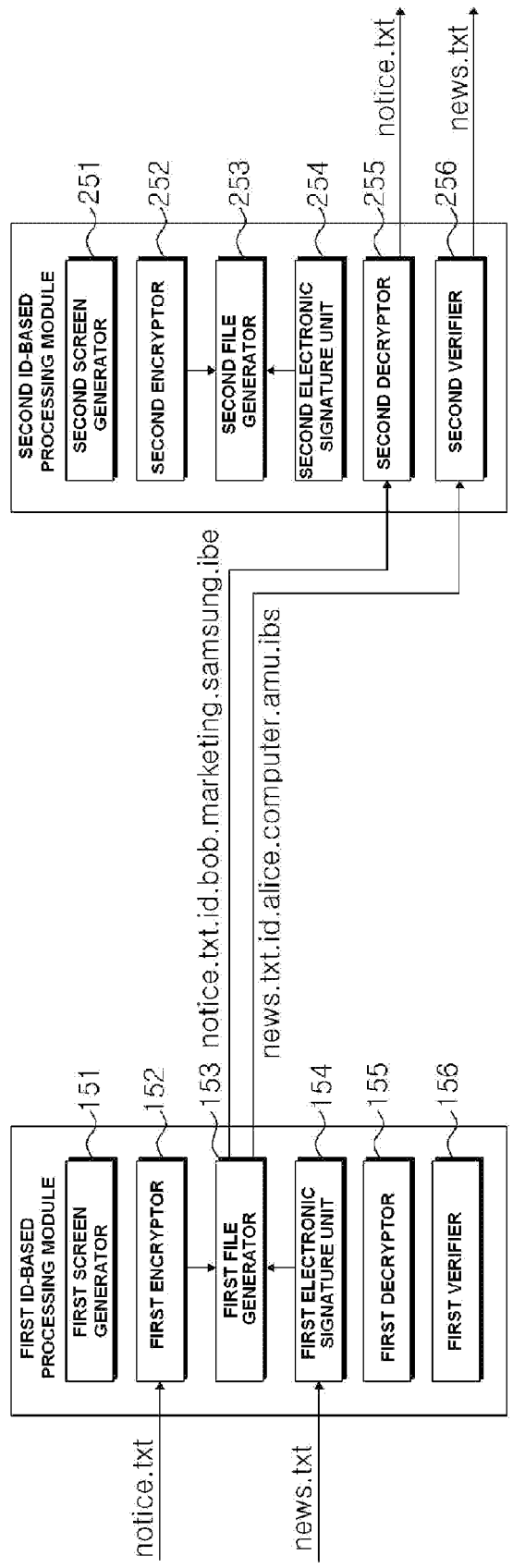
FIG. 7 is a block diagram of the first ID-based processing module and the second ID-based processing module according to another exemplary embodiment of the present disclosure.

An exemplary embodiment of FIG. 7 differs from the exemplary embodiment of FIG. 6 in that the first ID-based processing module 150 further includes a first file generator 153, and the second ID-based processing module 250 further includes a second file generator 253. While an extension is used as a means for identifying an encryption file or a signature file in the exemplary embodiment of FIG. 7, a header is used as a means for identifying an encryption file or a signature file in the exemplary embodiment of FIG. 6, which will be described in detail below.

Referring to FIG. 7, the first ID-based processing module 150 includes a first screen generator 151, a first encryptor 152, the first file generator 153, a first electronic signature unit 154, a first decryptor 155, and a first verifier 156.

When the first user requests execution of a dedicated program for operating the first ID-based processing module 150, the first screen generator 151 may generate various screens for ID-based encryption and signature (see FIG. 8 to FIG. 11). Through the various screens generated by the first screen generator 151, the first user may request the secret key issuing server 10 to issue a secret key corresponding to the ID of the first user or to provide the ID of the second user. Also, the first user may select a first file, select or delete the ID of the second user in an ID list of external users capable of receiving the first file, request encryption or an electronic signature of the first file, and request hierarchical encryption or hierarchical electronic signature. IDs displayed in the ID list are ID of the external users or IDs of groups, that is, IDs of users or groups allowed to receive the first file encrypted by the first user.

The first encryptor 152 may encrypt the first file using at least one ID selected by the first user from among the IDs displayed in the ID list, and insert information indicating that the first file has been encrypted in a header of the encrypted first file. The first encryptor 152 may encrypt the first file using a well-known IBE scheme.

As described with reference to FIG. 3A, the first encryptor 152 may encrypt the first file using one receiver ID. When the first user selects the ID of the second user who is a receiver, the first encryptor 152 may encrypt the first file using the ID of the second user as a public key.

Also, as described with reference to FIG. 3B, the first encryptor 152 may hierarchically encrypt the first file using a plurality of second user IDs. Hierarchical encryption is a method of hierarchically encrypting the first file using a plurality of second user IDs in sequence. The plurality of second user IDs may include at least one of an ID of an upper-level group to which the second user who will receive the first file belongs, an ID of a lower-level group that is a child node of the upper-level group, and the personal ID of the second user.

The first file generator 153 may set IDs of the second user that have been used to encrypt the first file by the first encryptor 152 as a part of a filename of the encrypted first file, and set the extension for encryption indicating that the first file has been encrypted as an extension of the first file, thereby generating an encryption file. More specifically, the first file generator 153 may set the original filename (notice) of the first file, the original extension (txt) of the first file, a distinguisher (id), and at least one ID (bob, marketing, or samsung) of the second user as a filename of the encryption file. The distinguisher enables distinguishing between the original filename of the first file and the ID of the second user used for encryption.

When electronic signature for a second file to be transmitted to the second user of the second terminal 200 is requested, the first electronic signature unit 154 may generate an electronic signature of the first user using the secret key paired with the ID of the first user, and append the generated electronic signature to the second file. Also, the first electronic signature unit 154 may insert information indicating that an electronic signature has been put to the second file in a header of the second file.

As described with reference to FIG. 3A, the first electronic signature unit 154 may generate an electronic signature to append to the second file using a secret key paired with one first user ID.

Also, as described with reference to FIG. 3B, the first electronic signature unit 154 may generate hierarchical electronic signatures using a plurality of first user IDs. Hierarchical electronic signature is a method of generating hierarchically generating electronic signatures for a second file using a plurality of first user IDs. The plurality of first user IDs may include at least one of an ID of an upper-level group to which the first user who will transmit a first file belongs, an ID of a lower-level group that is a child node of the upper-level group, and the personal ID of the first user.

The first file generator 153 may set an ID of the first user as a part of a filename of a second file to which an electronic signature has been appended, and set the extension for signature indicating that an electronic signature has been put to the second file as an extension of the second file, thereby generating a signature file. The first file generator 153 may set the original filename (news) of the second file, the original extension (txt) of the second file, a distinguisher (id), and at least one ID (alice, computer, or amu) of the first user as a filename of the signature file. The distinguisher of the signature file enables distinguishing between the original filename of the second file and the ID of the first user used for the electronic signature. The at least one ID of the first user set as a part of the filename of the signature file is an ID paired with at least one secret key of the first user used to generate the electronic signature.

In addition, the first electronic signature unit 154 may append an electronic signature to a first file encrypted by the first encryptor 152. In this case, the first file generator 153 may generate an encryption/signature file using an ID of the second user used for encryption, an ID of the first user used for the electronic signature, the extension for encryption, and the extension for signature.

The first decryptor 155 may decrypt an encryption file received from the second terminal 200. More specifically, when a file generated by the second terminal 200 is received by the first terminal 100, the OS or the first controller 160 of the first terminal 100 determines that the received file is an encryption file in the case of an extension of the received file being the extension for encryption, that is, ibe. In this way, the first decryptor 155 of the first ID-based processing module 150 may check an ID of the first user in the received encryption file, and decrypt the encryption file using a secret key of the first user paired with the checked ID. When a plurality of IDs of the first user are checked, the first decryptor 155 uses secret keys paired with the plurality of IDs of the first user. The first user may find that the received file is an encrypted file from the visually checked extension.

When a signature file is received from the second terminal 200, the first verifier 156 may verify an electronic signature of the received signature file. More specifically, when a signature file generated by the second terminal 200 is received by the first terminal 100, the OS of the first terminal 100 automatically executes a dedicated program associated with "ibs" in the case of an extension of the signature file is the extension for signature, that is, ibs. In this way, the first verifier 156 may check an ID of the second user in the received signature file, and verify the electronic signature using the checked ID and a verification algorithm.

Meanwhile, the second ID-based processing module 250 includes a second screen generator 251, a second encryptor 252, the second file generator 253, a second electronic signature unit 254, a second decryptor 255, and a second verifier 256. Operation of the respective components of the second ID-based processing module 250 is similar to that of the first ID-based processing module 150, and detailed description thereof will be omitted.

When the second user selects a third file to transmit to the first user and at least one ID of the first user who is the receiver, the second encryptor 252 may encrypt the third file using the at least one ID of the first user as a public key. The second file generator 253 may generate an encryption file according to the format shown in FIG. 3A or FIG. 3B.

The second decryptor 255 checks IDs (samsung, marketing, and bob) of the second user (i.e., receiver) interposed between the distinguisher (id) and the extension for encryption (ibe) in the filename of an encryption file (notice. txt.id.bob.marketing.samsung.ibe) received from the first terminal. The second decryptor 255 may decrypt the encryption file using secret keys paired with the checked IDs of the second user, thereby outputting a first file (notice.txt). The output first file may be displayed through an associated program, such as Notepad.

The second electronic signature unit 254 may generate an electronic signature of the second user using a secret key paired with an ID of the second user (i.e., transmitter), and append the electronic signature to a fourth file.

The second verifier 256 checks IDs (amu, computer, and alice) of the first user (i.e., transmitter) interposed between the extension for signature (ibs) and the distinguisher (id) of a signature file received from the first terminal. The second verifier 256 may verify an electronic signature using the checked IDs of the first user and a verification algorithm, and output a second file (news.txt) when the verification succeeds. The output second file may be displayed through an associated program, such as Notepad.

Encryption, decryption, and appending and verification of an electronic signature according to the exemplary embodiment of FIG. 7 will be described in further detail below with reference to FIG. 15 and FIG. 16.

Figure 15:
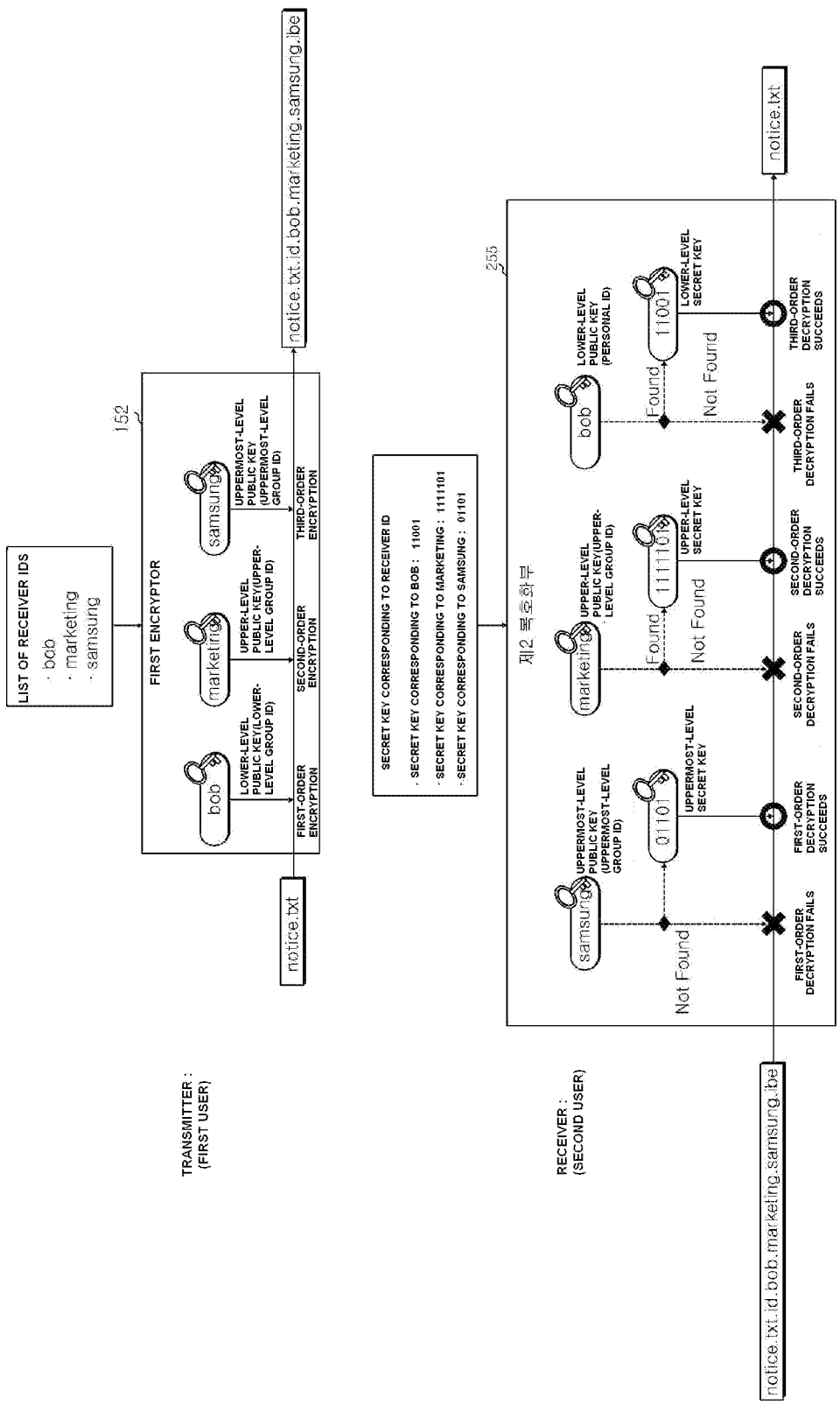
FIG. 15 is a diagram illustrating an example in which the first encryptor encrypts a first file using three IDs of a second user to generate an encryption file, and the second decryptor decrypts the encryption file.

FIG. 15 is a diagram illustrating an example in which a first encryptor encrypts a first file using three IDs of a second user to generate an encryption file, and a second decryptor decrypts the encryption file.

Referring to FIG. 15, when the first user selects notice.txt as a first file to be encrypted and requests encryption, the first screen generator 151 generates a screen (e.g., FIG. 10) through which an ID of the second user who will receive the first file can be input or selected. When the first user sequentially selects "bob," "marketing," and "samsung" as IDs of the second user in the generated screen, the first encryptor 152 may encrypt the first file a first time using the personal ID "bob" among the IDs of the second user as a public key, encrypt the first file a second time using the ID "marketing" of the upper-level group, and encrypt the first file a third time using the ID "samsung" of the uppermost-level group.

The first file generator 153 may determine the original filename and the file extension of the first file, a distinguisher, and IDs of the second user as a filename, and use the extension for encryption, thereby generating the encryption file "notice.txt.id.bob.marketing.samsung.ibe."

The second terminal 200 receiving the encryption file may recognize "ibe" in "notice.txt.id.bob.marketing.samsung.ibe" as an extension, and execute a dedicated program designated as an associated program of "ibe." The second ID-based processing module 250 or the second decryptor 255 may determine that the received file is an encryption file from "ibe" that is the extension for encryption of the encryption file. The second decryptor 255 may sequentially check the IDs (i.e., samsung, marketing, and bob) beginning with an ID in front of the extension for encryption and ending with an ID behind the distinguisher "id" in "notice.txt.id.bob.marketing-.samsung.ibe." When "samsung" among the checked IDs is the same as an ID of the uppermost-level group to which the second user belongs, the second decryptor 255 may decrypt the encryption file a first time using a secret key (01101) paired with "samsung," decrypt the first-order-decrypted encryption file a second time using a secret key (1111101) paired with "marketing," and decrypt the second-order-decrypted encryption file a third time using a secret key (11001) paired with "bob." When all the first-order to third-order decryption succeeds, the second decryptor 255 outputs the first file "notice.txt." When the secret keys paired with the IDs "bob," "marketing," and "samsung" of the second user are not in the second terminal 200, the decryption fails.

Figure 16:
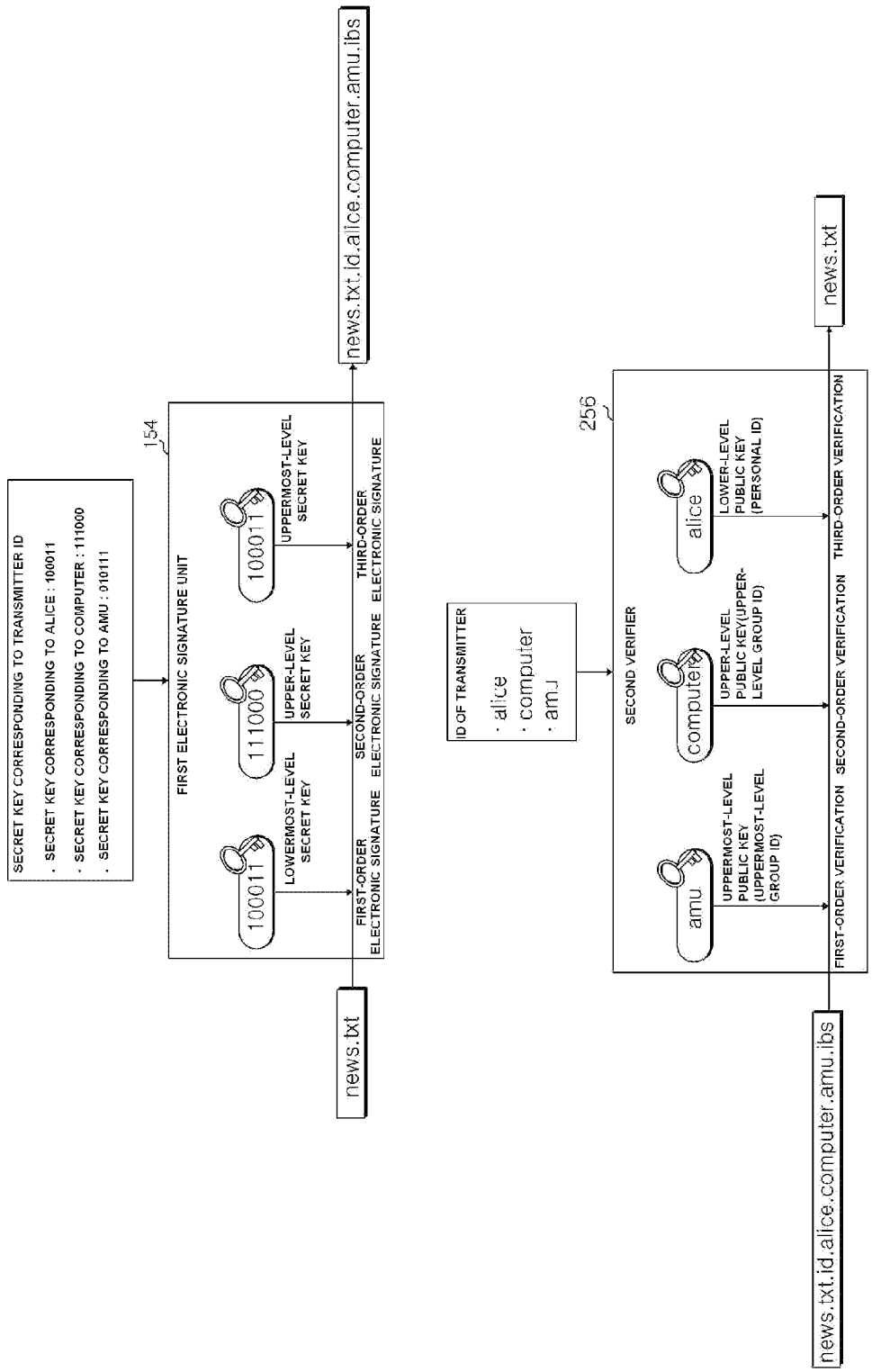
FIG. 16 is a diagram illustrating an example in which the first electronic signature unit appends an electronic signature to a second file using three IDs of a first user, and the second verification unit verifies the validity of the electronic signature appended to the second file.

FIG. 16 is a diagram illustrating an example in which a first electronic signature unit appends an electronic signature to a second file using three IDs of a first user, and a second verification unit verifies the validity of the electronic signature appended to the second file.

Referring to FIG. 16, when the first user selects "newx.txt" and requests an electronic signature, the first electronic signature unit 154 generates a screen (not shown) through which an ID of the first user to be used for the electronic signature can be input or selected. When the first user sequentially selects "alice," "computer," and "amu" in the generated screen as IDs of the first user, the first electronic signature unit 154 may generate a first-order electronic signature using a secret key (100011) corresponding to the personal ID "alice," generate a second-order electronic signature using a secret key (111000) corresponding to the ID "computer" of the upper-level group, generate a third-order electronic signature using a secret key (010100) corresponding to the ID "amu" of the uppermost-level group, and then append the three electronic signatures to a second file.

The first file generator 153 may determine the original filename, the file extension, a distinguisher, IDs of the first user as a filename, and use the extension for signature, thereby generating the signature file "newx.txt.id.alice.computer.amu.ibs."

The second terminal 200 receiving the signature file may recognize "ibs" in "newx.txt.id.alice.computer.amu.ibs" as an extension, and execute a dedicated program designated as an associated program of "ibs." The second ID-based processing module 250 or the second verifier 256 may determine that the received file is a signature file from "ibs" that is the extension for signature of the signature file. The second verifier 256 may sequentially check the IDs (i.e., amu, computer, and alice) beginning with an ID in front of the extension for signature and ending with an ID behind the distinguisher "id" in "notice.txt.id.bob.marketing.samsung.ibe." When the checked IDs are the same as IDs of the first user stored in the second storage 240, the second verifier 256 may hierarchically verify the validity of the electronic signatures using the stored IDs of the first user, the IDs set in the signature file, and a verification algorithm. When all the first-order to third-order verification succeeds, the second verifier 256 outputs the file "newx.txt."

In this exemplary embodiment, it has been described that the second verifier 256 hierarchically verifies the validity of electronic signatures. However, this is an example, and another configuration can also be implemented. For example, when electronic signatures are hierarchically made, a server may verify the validity of electronic signatures in some hierarchies, and the second verifier 256 may verify the validity of electronic signatures in other hierarchies.

Figure 17:
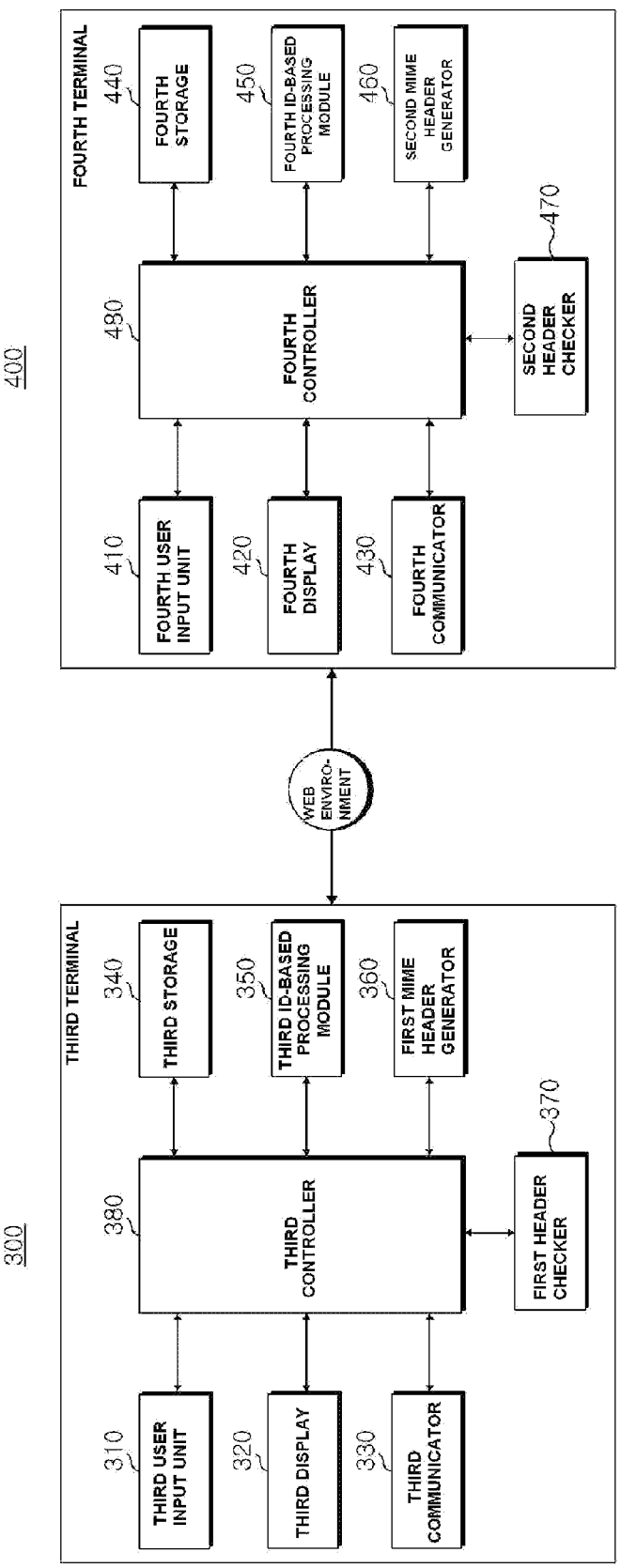
FIG. 17 is a block diagram showing a third terminal and a fourth terminal including an ID-based encryption and signature device according to another exemplary embodiment of the present disclosure.

FIG. 17 is a block diagram showing a third terminal and a fourth terminal including an ID-based encryption and signature device according to another exemplary embodiment of the present disclosure.

Referring to FIG. 17, a third terminal 300 includes a third user input unit 310, a third display 320, a third communicator 330, a third storage 340, a third ID-based processing module 350, a first MIME header generator 360, a first header checker 370, and a third controller 380. A fourth terminal 400 includes a fourth user input unit 410, a fourth display 420, a fourth communicator 430, a fourth storage 440, a fourth ID-based processing module 450, a second MIME header generator 460, a second header checker 470, and a fourth controller 480. Operation of the third terminal 300 and the fourth terminal 400 is similar to that of the first terminal 100 and the second terminal 200, and detailed description thereof will be omitted.

From now, a user of the third terminal 300 is called a "third user," a user of the fourth terminal 400 is called a "fourth user," a file to be encrypted and transmitted from the third terminal 300 to the fourth terminal 400 is called a "first file," a file to be transmitted from the third terminal 300 to the fourth terminal 400 after an electronic signature is appended thereto is called a "second file," a file to be encrypted and transmitted from the fourth terminal 400 to the third terminal 300 is called a "third file," and a file to be transmitted from the fourth terminal 400 to the third terminal 300 after an electronic signature is appended thereto is called a "fourth file."

The third ID-based processing module 350 may encrypt a first file using an ID of a fourth user who will receive the first file as a public key, thereby generating an encryption file. Also, the third ID-based processing module 350 may generate an electronic signature using a secret key corresponding to a third user who transmits a second file and append the electronic signature to the second file, thereby generating a signature file. The third ID-based processing module 350 may generate an encryption file or a signature file in the same format as shown in FIG. 3A or FIG. 3B.

When an encryption file is transmitted to the fourth user (i.e., receiver) of the fourth terminal 400 through a web environment, the first MIME header generator 360 may generate a MIME header including information indicating that the encryption file has been encrypted. The first MIME header generator 360 may use the extension for encryption (ibe), which is used as an extension of the encryption file, as information indicating that the encryption file has been encrypted. For example, simple mail transfer protocol (SMTP) can only transmit a message of American standard code for information interchange (ASCII) characters in request for comments (RFC) 822 format. The MIME support a code conversion scheme of converting multiple 2-byte languages, such as Korean, and binary files, such as execution files and image files, into ASCII code such that the multiple 2-byte languages and the binary files can be transmitted according to SMTP.

Figure 18:
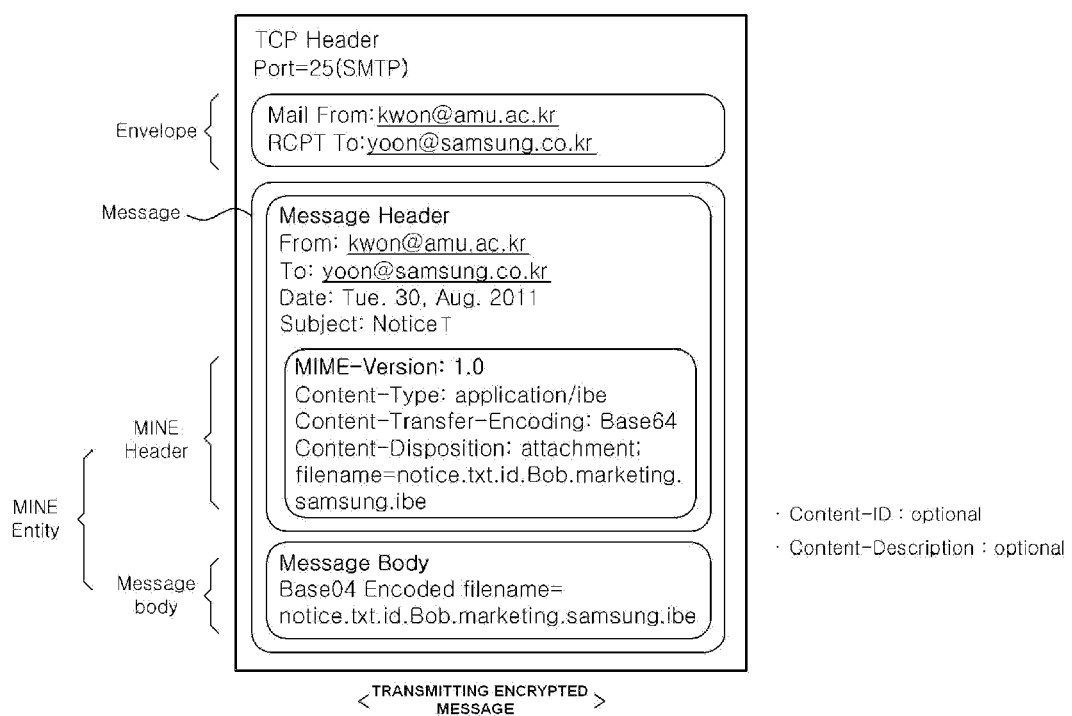
FIG. 18 is a diagram showing an example of a Multipurpose Internet Message Extensions (MIME) header generated when an encrypted message is transmitted according to an exemplary embodiment of the present disclosure.

FIG. 18 is a diagram showing an example of a MIME header generated when an encrypted message is transmitted according to an exemplary embodiment of the present disclosure.

When an encryption file is generated by the third ID-based processing module 350, the first MIME header generator 360 may generate a MIME message including a MIME header as shown in FIG. 18.

The first MIME header generator 360 writes an email address of a user who sends the message and an email address of a receiver who receives the message in an envelope area.

Also, the first MIME header generator 360 may write MIME version, content-type, content-transfer-encoding, content-disposition, content-ID, and content-description information in a MIME header area. More specifically, the first MIME header generator 360 may write "application/ibe" as content-type information when a file generated by the third ID-based processing module 350 has the extension for encryption, and may write "application/ibs" as content-type information when a file generated by the third ID-based processing module 350 has the extension for signature.

Thus, when the file generated by the third ID-based processing module 350 is an encryption file, the first MIME header generator 360 writes "application/ibe/" as content-type information, and writes the file name "notice.txt.id.Bob.marketing.samsung.ibe" of the encryption file generated by the third ID-based processing module 350 as a filename in content-disposition information.

Content-ID information and content-description information may be optionally written, and are omitted in FIG. 18.

Also, the first MIME header generator 360 may write the filename of a file generated by the third ID-based processing module 350 in a message body area.

The third communicator 330 may transmit a generated encryption file or signature file and a MIME header to the fourth terminal 400 through a web environment.

The second header checker 470 of the fourth terminal 400 may check information (i.e., ibe or ibs) included in the MIME header by parsing the MIME header received from the third terminal 300, and execute an associated program designated for the checked information. When the associated program is executed by the second header checker 470, the fourth ID-based processing module 450 operating in conjunction with the associated program may decrypt an encryption file in the case of the received file being the encryption file, and may verify an electronic signature in the case of the received file being a signature file.

When an encryption file or signature file and a MIME header are received through a messenger installed in the third terminal 300 and the fourth terminal 400, the second header checker 470 may be a messenger application. Also, when an encryption file or signature file and a MIME header are received through an email, the second header checker 470 may be a web browser.

FIG. 19 shows an example of a part of a message transmitted to a fourth terminal together with a signature file to which an electronic signature has been appended, and a part of a message transmitted to the fourth terminal together with a file to which encryption and electronic signature both is applied.

Referring to FIG. 19, in a MIME header transmitted with a signature file, "application/ibs" is written as content-type information, and "notice.txt.id.Alice.computer.amu.ibs" is written as a filename.

Also, in a MIME header transmitted with a file to which encryption and electronic signature both is applied, "application/ibe" and "application/ibs" are written as content-type information, and "notice.txt.id.Bob.marketing.samsung.ibe" and "notice.txt.id.Alice.computer.amu.ibs" are written as filenames.

Various application examples of an exemplary embodiment of the present disclosure will be described below with reference to FIG. 20 to FIG. 27.

Figure 20:
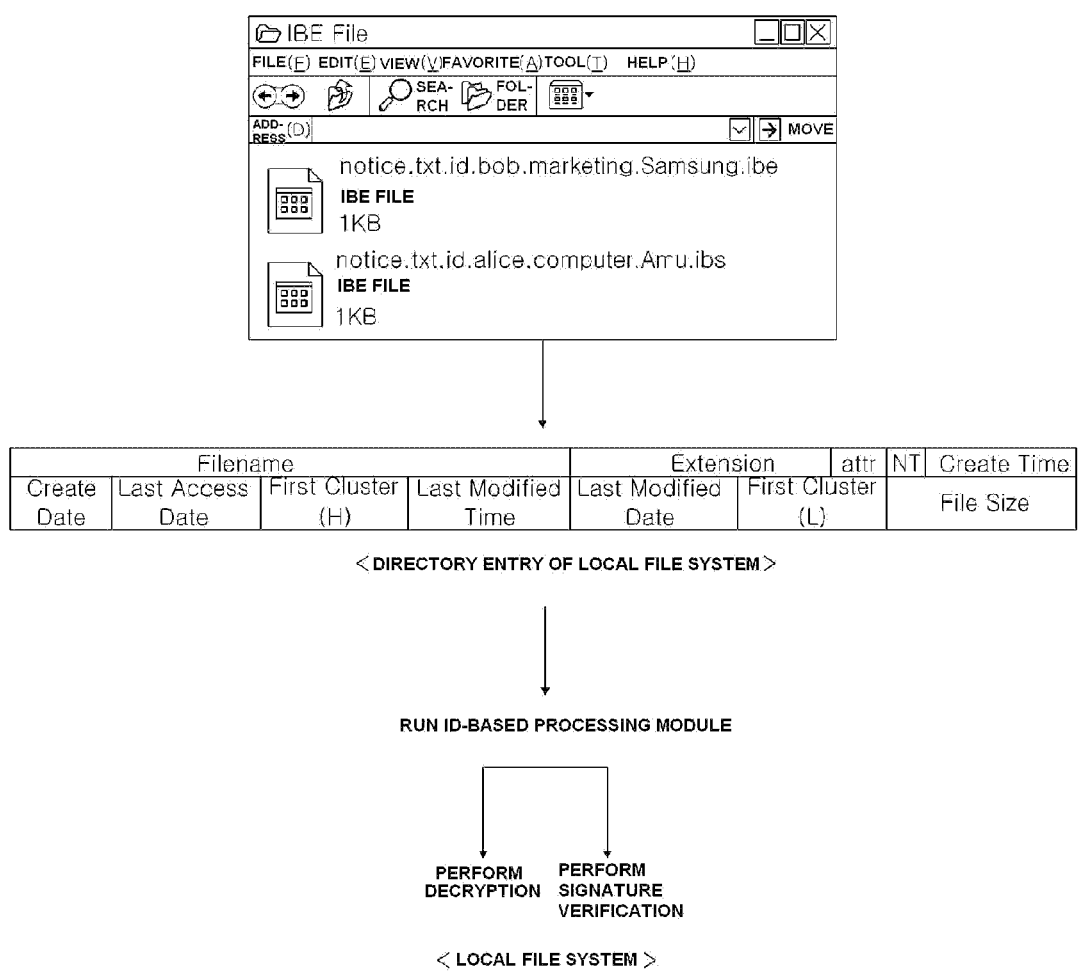
FIG. 20 is a diagram showing an example of application in which an operating system (OS) of a terminal runs an ID-based processing module using a local file system.

FIG. 20 is a diagram showing an example of application in which an OS of a terminal runs an ID-based processing module using a local file system.

Referring to FIG. 20, when an encryption file or a signature file is received by a terminal, an OS of the terminal may check an extension of the file from directory entries of a local file system. The directory entries include various kinds of information related to a file, such as filename, extension, attribute, create time, date, first cluster, file size, and so on. The OS may determine that the received file is an encryption file when "ibe" is written as an extension among the directory entries, and may determine that the received file is a signature file when "ibs" is written as an extension. The OS executes a dedicated program designated as an associated program of "ibe" or "ibs," that is, an ID-based processing module, and thereby the encryption file may be decrypted or an electronic signature of the signature file may be verified. The terminal of FIG. 20 may be the first terminal 100 or the second terminal 200, and the ID-based processing module may be the first ID-based processing module 150 or the second ID-based processing module 250 according to the exemplary embodiment of FIG. 7.

Figure 21:
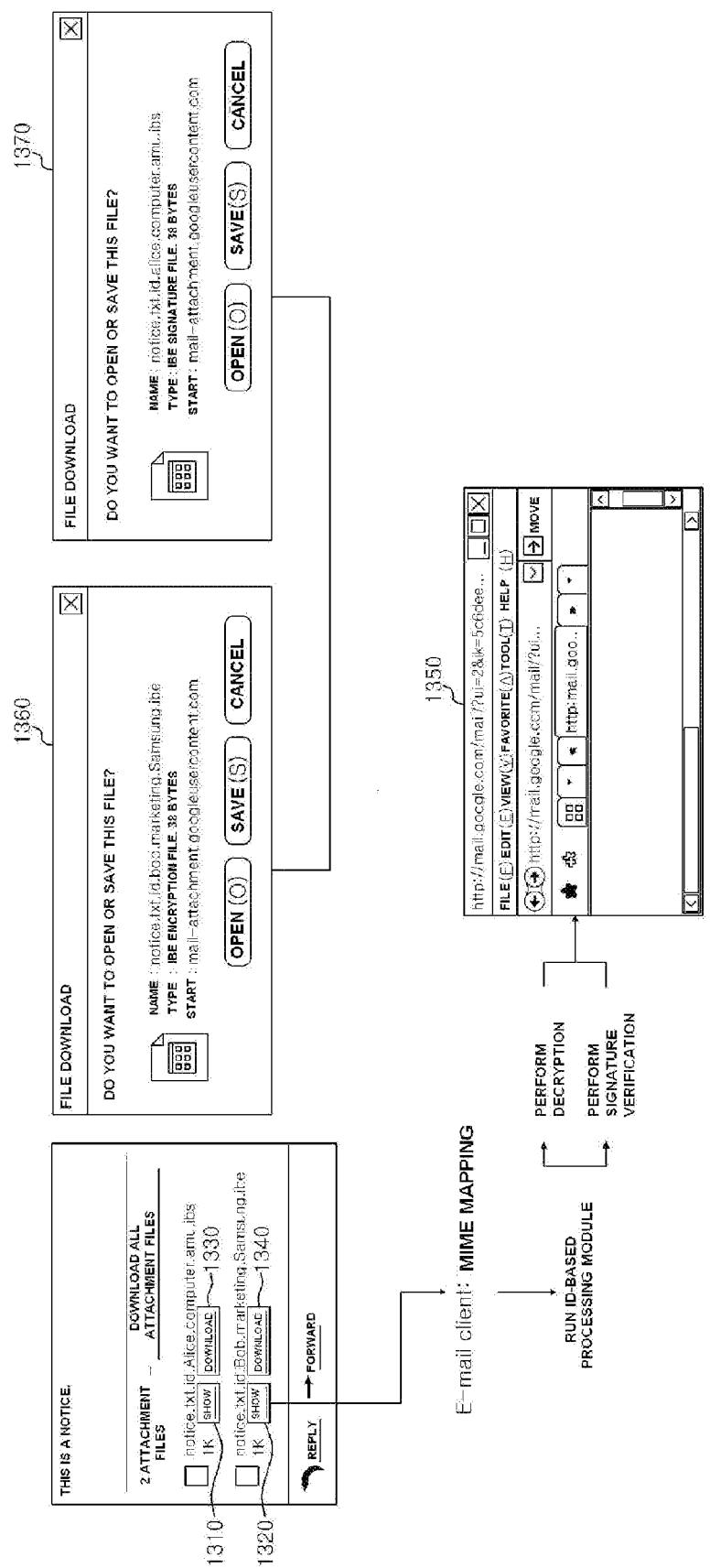
FIG. 21 is a diagram showing an example of application in which an ID-based processing module is run using the MIME when a file attached to an email is received.

FIG. 21 is a diagram showing an example of application in which an ID-based processing module is run using the MIME when a file attached to an email is received.

FIG. 21 shows a screen displaying the content of an email which is received through a web environment and to which a file has been attached. The content of the email is "This is a notice.", and two attachment files are included in the email. The two attachment files can be shown or downloaded.

When a user of a terminal selects show menus 1310 and 1320, an email client may check the types, that is, extensions, of the attachment files from a MIME header of the email. When the extensions written in the MIME header is "ibe" or "ibs," the email client may run an ID-based processing module. In this way, the ID-based processing module may decrypt encryption files when the received files are the encryption files, and may verify electronic signatures when the received files are signature files. The decrypted files or the files whose signatures have been verified may be displayed through a screen 1350 provided to the terminal by a web browser.

Also, when the user selects download menus 1330 and 1340, the email client or the web browser generates screens 1360 and 1370 for downloading the attachment files.

The terminal of FIG. 21 may be the third terminal 300 or the fourth terminal 400, the ID-based processing module may be the third ID-based processing module 350 or the fourth ID-based processing module 450, and the email client may include operation of the first header checker 370 or the second header checker 470.

Figure 22:
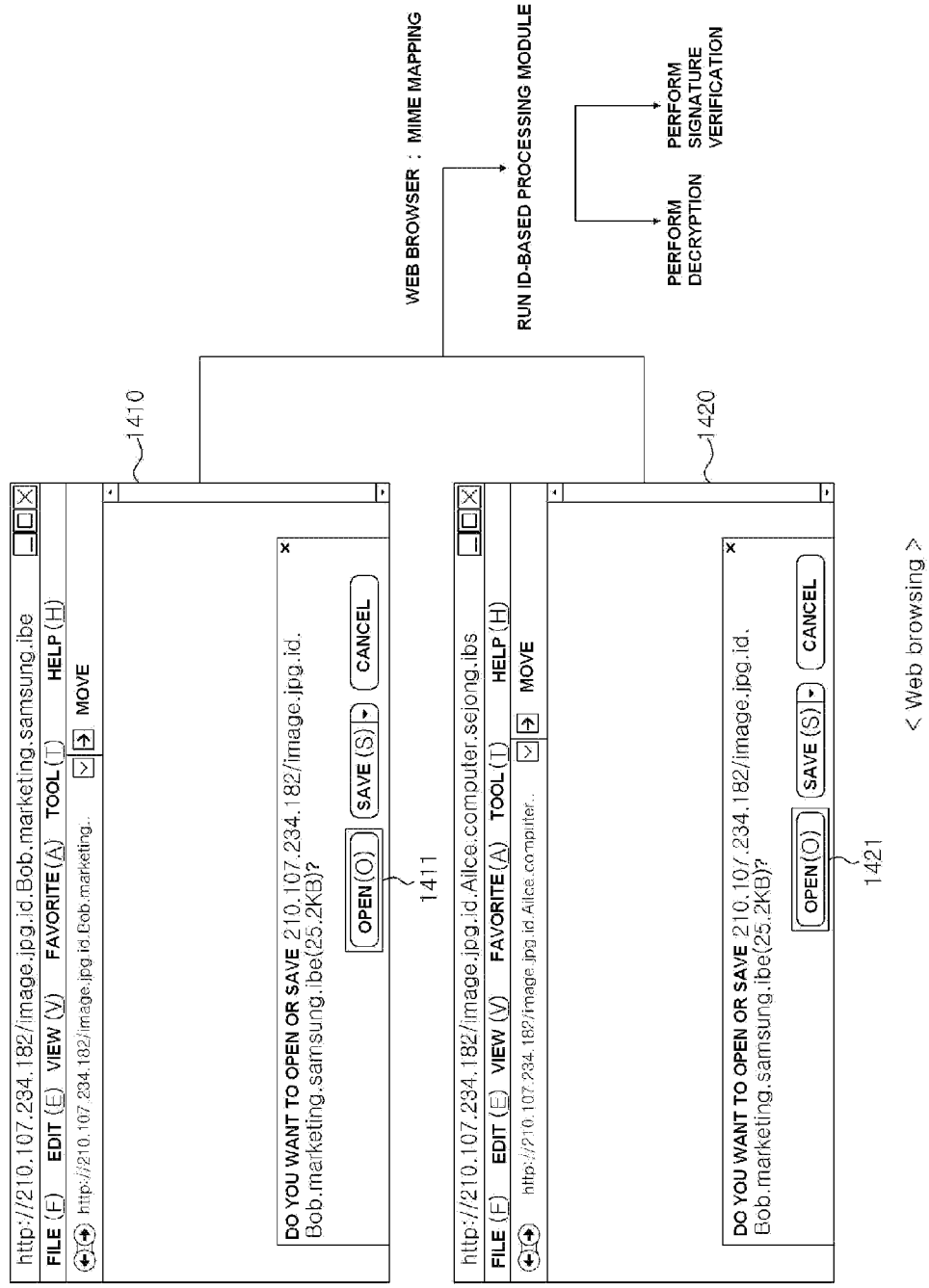
FIG. 22 is a diagram showing an example of application in which an ID-based processing module is run using the MIME to open a file on a web page.

FIG. 22 is a diagram showing an example of application in which an ID-based processing module is run using the MIME to open a file on a web page.

Referring to FIG. 22, a user may open a web page through a web browser, and the web page may correspond to a uniform resource locator (URL) in which a file is stored. In other words, when web pages 1410 and 1420 that the user wants to open are file documents, and the user selects open menus 1411 and 1421, the web browser may check extensions in the filenames of the file documents. When the extensions checked from MIME headers of the files are "ibe" or "ibs," the web browser may run an ID-based processing module. The ID-based processing module may decrypt an encryption file, and verify an electronic signature of a signature file.

The terminal of FIG. 22 may be the third terminal 300 or the fourth terminal 400, the ID-based processing module may be the third ID-based processing module 350 or the fourth ID-based processing module 450, and the web browser may include operation of the first header checker 370 or the second header checker 470.

Figure 23:
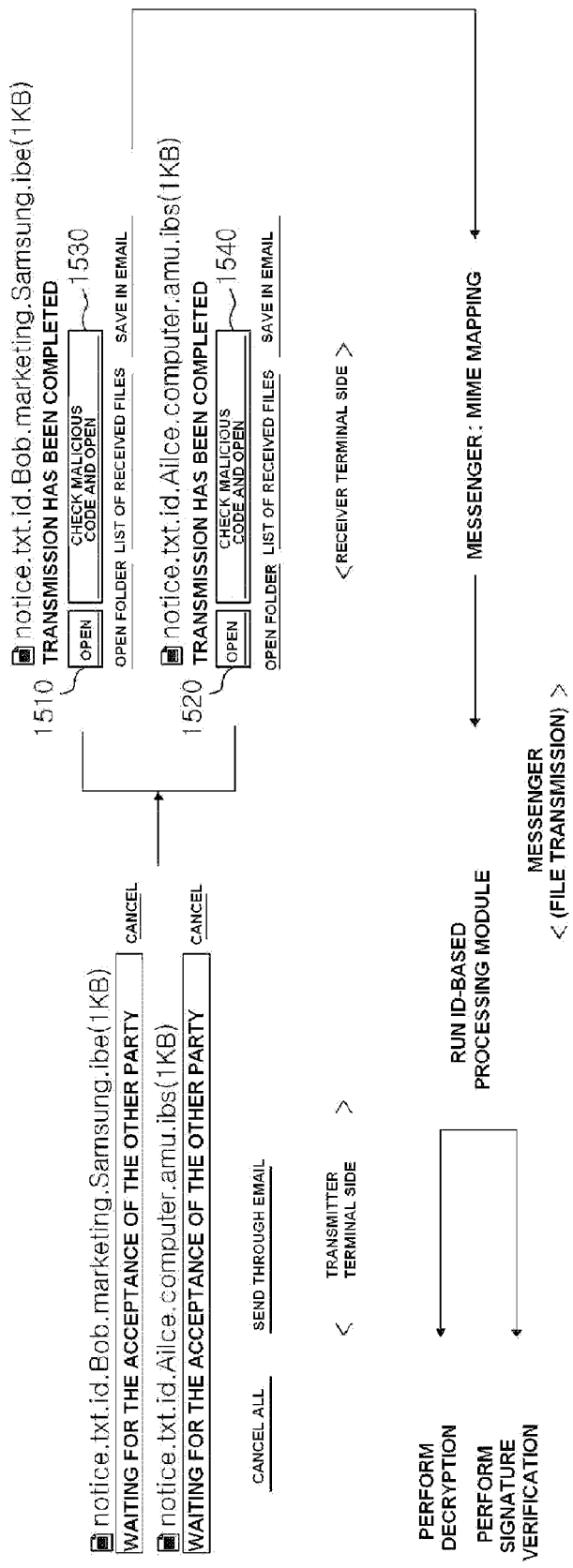
FIG. 23 is a diagram showing a first example of application in which an ID-based processing module is run using the MIME when a file is received through a messenger.

FIG. 23 is a diagram showing a first example of application in which an ID-based processing module is run using the MIME when a file is received through a messenger.

Referring to FIG. 23, a transmitter terminal transmits an encryption file (notice.txt.id.Bob.marketing.samsung.ibe) and a signature file (notice.txt.id.Alice.computer.amu.ibs) to a receiver terminal through a messenger. When a user of the receiver terminal selects open menus 1510 and 1520 or check-malicious-code and open menus 1530 and 1540 after transmission of the two files is completed, the messenger may check extensions of the encryption file and the signature file by checking MIME headers received with the files. When extensions written in the MIME headers are "ibe" or "ibs," the messenger may run an ID-based processing module. In this way, the ID-based processing module may decrypt encryption files when the received files are encryption files, and may verify electronic signatures when the received files are signature files.

When the transmitter terminal of FIG. 23 is the third terminal 300, and the receiver terminal is the fourth terminal 400, the ID-based processing module may be the fourth ID-based processing module 450, and the messenger may include operation of the second header checker 470.

Figure 24:
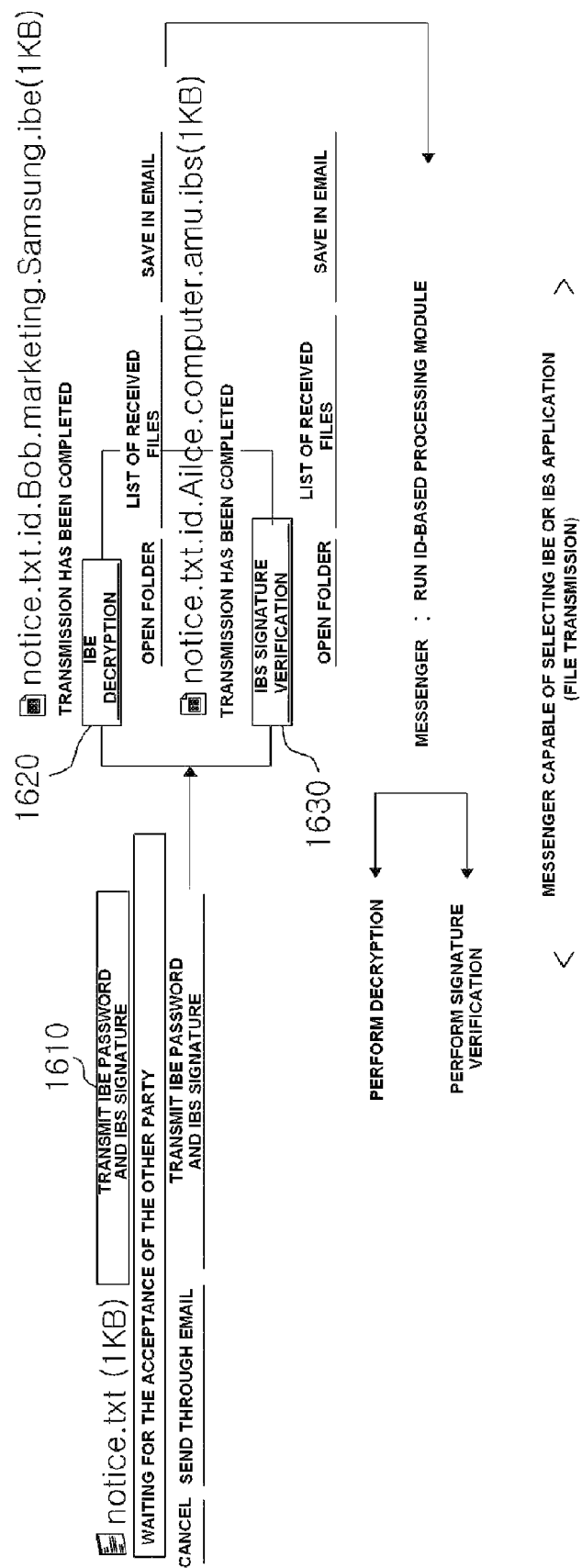
FIG. 24 is a diagram showing a second example of application in which an ID-based processing module is run using the MIME when a file is received through a messenger.

FIG. 24 is a diagram showing a second example of application in which an ID-based processing module is run using the MIME when a file is received through a messenger.

Referring to FIG. 24, when a user of a transmitter terminal tries to transmit a general file (notice.txt) to a receiver terminal, a messenger of the transmitter terminal may provide a function of encrypting the general file or appending an electronic signature to the general file and transmitting the general file through the messenger. In other words, the messenger may provide an IBE password and IBS signature transmission function.

More specifically, when the user of the transmitter terminal selects a general file to transmit through a file transmission menu (not shown) provided by the messenger and selects an IBE password and IBS signature transmission function 1610, an ID-based processing module set to operate in conjunction with the messenger may generate an encryption file (notice.txt.id.Bob.marketing.samsung.ibe) by encrypting the general file or generate a signature file (notice.txt.id.Alice.computer.amu.ibs) by appending an electronic signature to the general file, and transmit the encryption file or the signature file to the receiver terminal. After transmission of the encryption file or the signature file is completed, the messenger of the receiver terminal may run an ID-based processing module automatically or when a user of the receiver terminal selects an IBE decryption menu 1620 or an IBS signature verification menu 1630. In this way, the ID-based processing module may decrypt the encryption file or verify the electronic signature of the signature file. Each of the transmitter terminal and the receiver terminal of FIG. 24 may be one of the first to fourth terminals 100 to 400.

Figure 25:
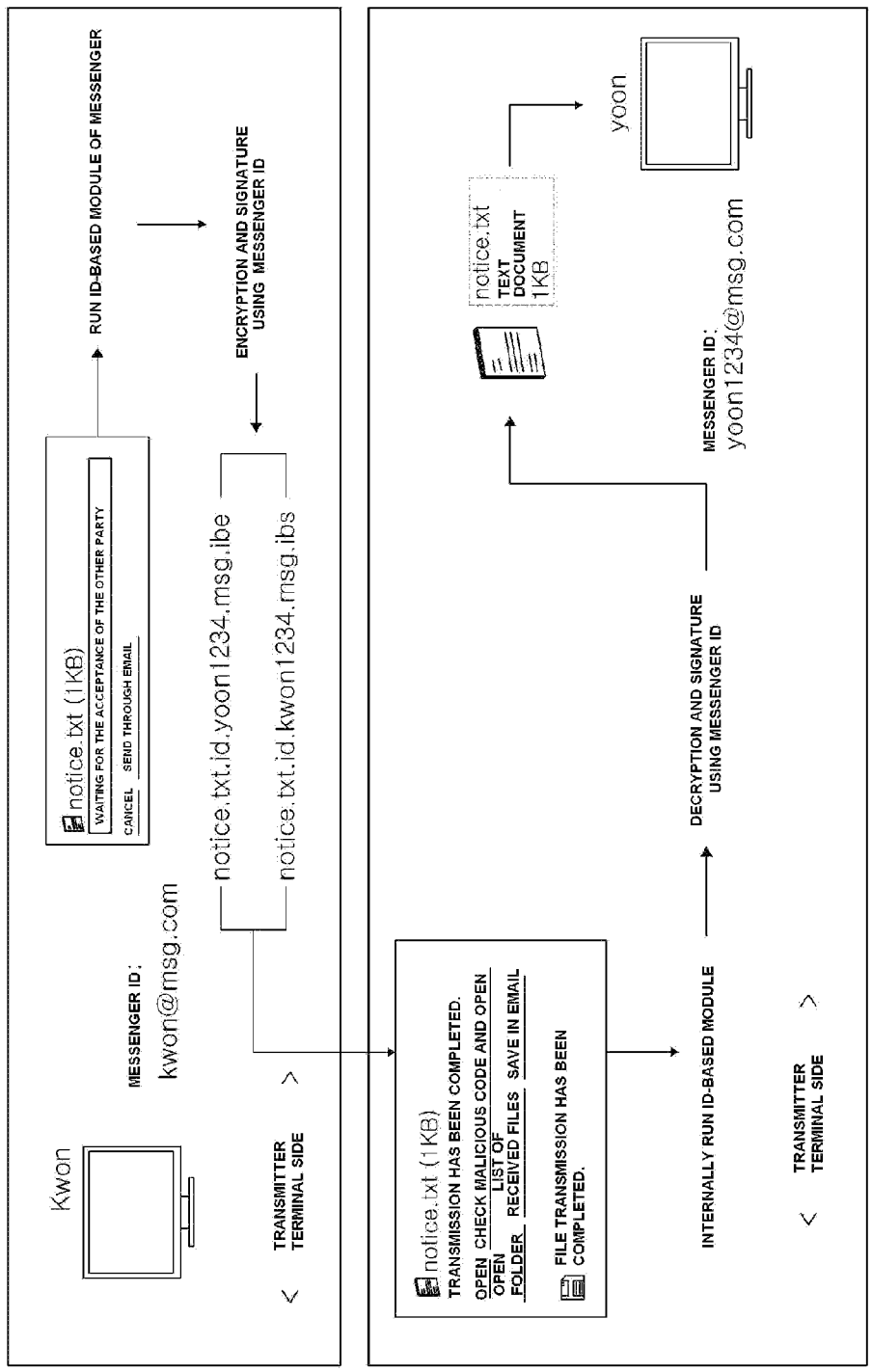
FIG. 25 is a diagram showing a third example of application in which an ID-based processing module is run using the MIME when a file is received through a messenger.

FIG. 25 is a diagram showing a third example of application in which an ID-based processing module is run using the MIME when a file is received through a messenger.

Referring to FIG. 25, a messenger installed in a transmitter terminal and a receiver terminal may include an ID-based processing module therein. Thus, the messenger may encrypt a file to transmit or append an electronic signature to the file, and may decrypt a received file or verify an electronic signature.

For example, when Kwon tries to transmit a general file "notice.txt" to Yoon through the messenger, the messenger of the transmitter terminal may automatically run an ID-based processing module included in the messenger to generate an encryption file or a signature file from the general file. At this time, the messenger may generate an encryption file (notice.txt.id.yoon1234.msg.ibe) or a signature file (notice.txt.id.kwon1234.msg.ibs) using a messenger ID (kwon1234@msg.com) of Kwon, the transmitter, or a messenger ID (yoon1234@msg.com) of Yoon, the receiver. Options for selectively generating an encryption file and a signature file may be set by a user through a menu screen (not shown) provided by the messenger.

The messenger of the receiver terminal receiving the encryption file or the signature file may execute the ID-based processing module included in the messenger, thereby decrypting the encryption file or verifying an electronic signature of the signature file. The messenger of the receiver terminal may decrypt the encryption message using a secret key corresponding to the ID (yoon1234@msg.com) of the receiver, or verify the electronic signature using the ID (kwon1234@msg.com) of the transmitter.

Figure 26:
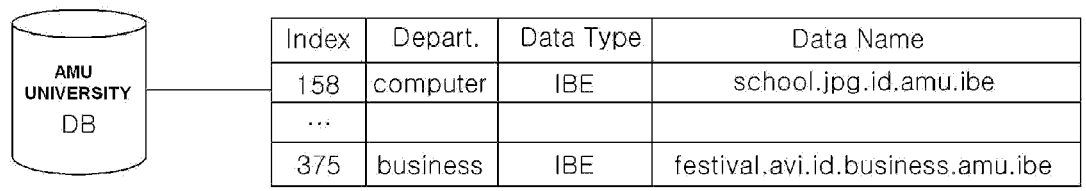
FIG. 26 is a diagram illustrating a method of using an ID-based processing module to store data, such as a file, in a database (DB) and use the stored data.

FIG. 26 is a diagram illustrating a method of using an ID-based processing module to store data, such as a file, in a database (DB) and use the stored data.

To store encrypted data using an ID-based processing module, as shown in a table of FIG. 26, a depart. column presenting a department (omissible when it is information having already been shown in an extension of the corresponding file) to which the corresponding file belongs, a data type column specifying that an ID-based processing module has been used, a data name column presenting a data name obtained by applying this exemplary embodiment to an extension of a filename of the data, and other columns are added and managed upon generation of a DB table. Also, by accessing the corresponding encrypted data DB through a web browser, etc., that is, by accessing the corresponding DB data using an address, such as http://www.amu.ac.kr/school.jpg.id.amu.ibe shown in FIG. 26, etc., it is possible to decrypt and use a desired file.

Figure 27:
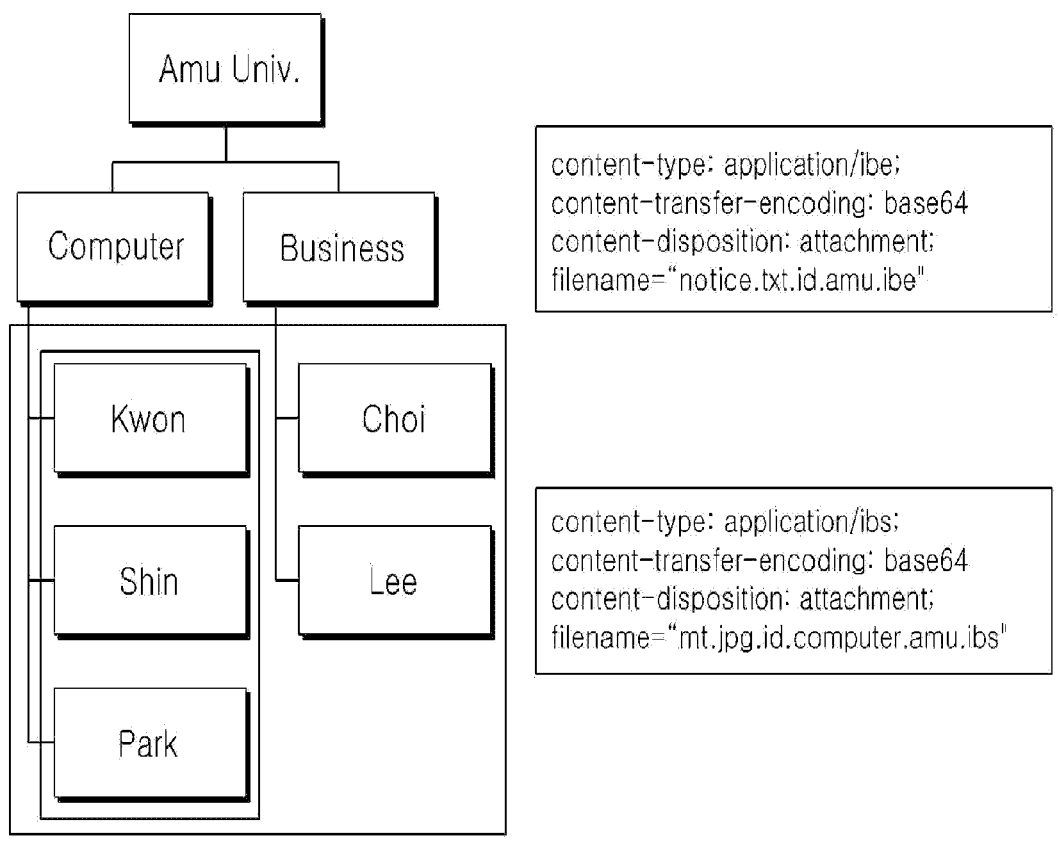
FIG. 27 is a diagram illustrating a method of broadcasting a file to which a signature has been put by an ID-based processing module by practically using hierarchical keys.

FIG. 27 is a diagram illustrating a method of broadcasting a file to which a signature has been put by an ID-based processing module by practically using hierarchical keys.

As shown in FIG. 27, when there are computer and business departments in Amu university, professors Kwon, Shin, and Pak belong to the computer department, and professors Choi and Lee belong to the business department, it is possible to easily check from a filename alone that a file with a signature of amu, such as "notice.txt.id.amu.ibs" is a broadcast to all the professors belonging to amu, and "mt.jpg.id.computer.amu.ibs" is a broadcast to professors belonging to a specific department, that is, the computer department.

Figure 28:
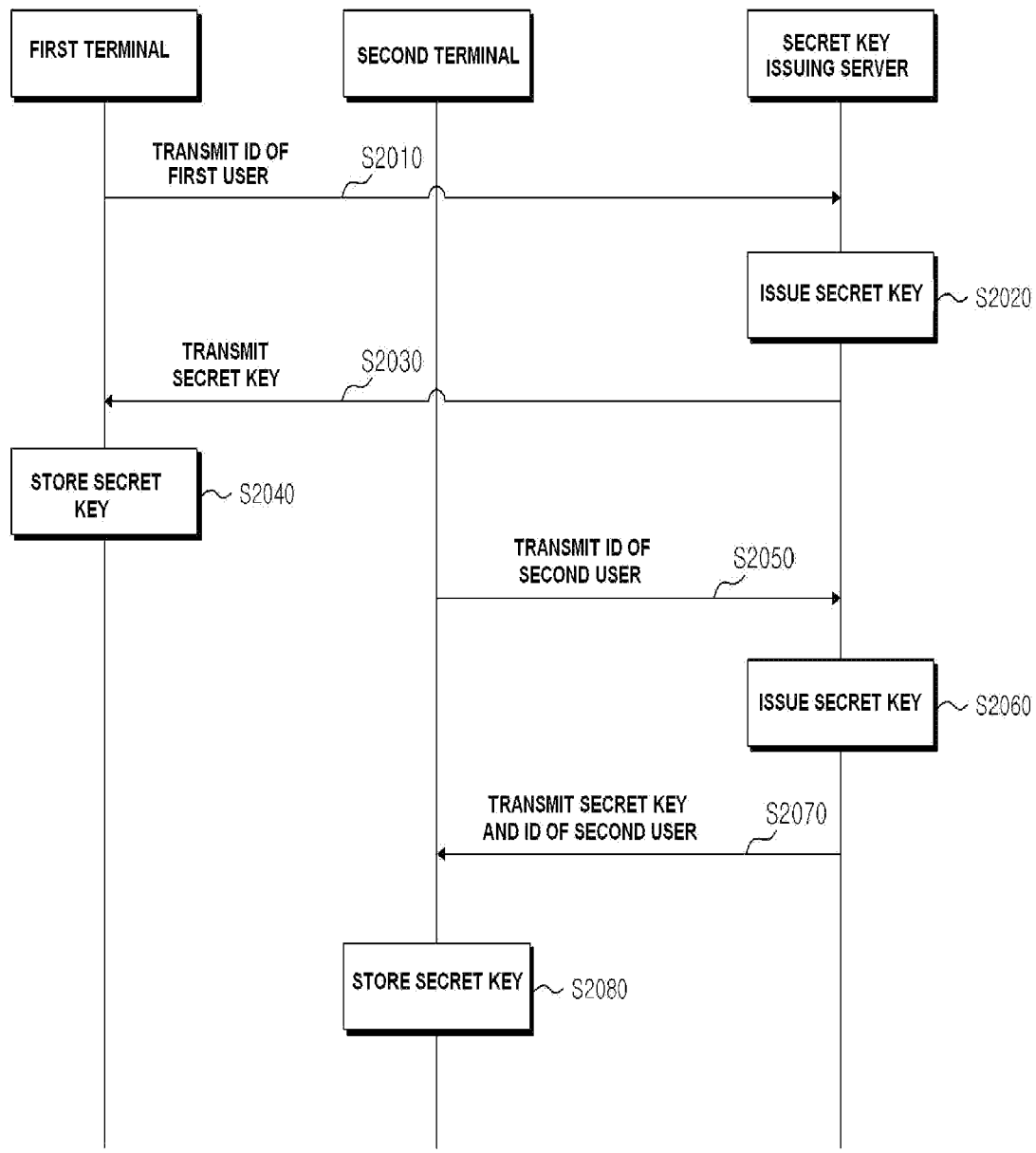
FIG. 28 is a flowchart illustrating a method of issuing a secret key according to an exemplary embodiment of the present disclosure.

FIG. 28 is a flowchart illustrating a method of issuing a secret key according to an exemplary embodiment of the present disclosure.

In FIG. 28, a first terminal may be the first terminal 100 or the third terminal 300, and a second terminal may be the second terminal 200 or the fourth terminal 400.

Referring to FIG. 28, the first terminal requests issue of a secret key while transmitting an ID of a first user input by the first user to a secret key issuing server (S2010). The ID of the first user may include at least one of personal IDs assigned to the first user only and group IDs assigned to groups to which the user belongs.

The secret key issuing server issues a secret key paired with the ID of the first user using a secret key issuing algorithm (S2020).

The secret key issuing server transmits the issued secret key to the first terminal (S2030), and the first terminal stores the secret key paired with the ID of the first user (S2040).

The second terminal requests issue of a secret key while transmitting an ID of a second user input by the second user to the secret key issuing server (S2050).

The secret key issuing server issues a secret key paired with the ID of the second user using a secret key issuing algorithm (S2060).

The secret key issuing server transmits the secret key issued in step S2060 to the second terminal (S2070).

The second terminal maps the secret key that is paired with the ID of the second user and received in step S2070 to the ID of the second user, and stores the secret key with the ID of the second user (S2080).

Figure 29:
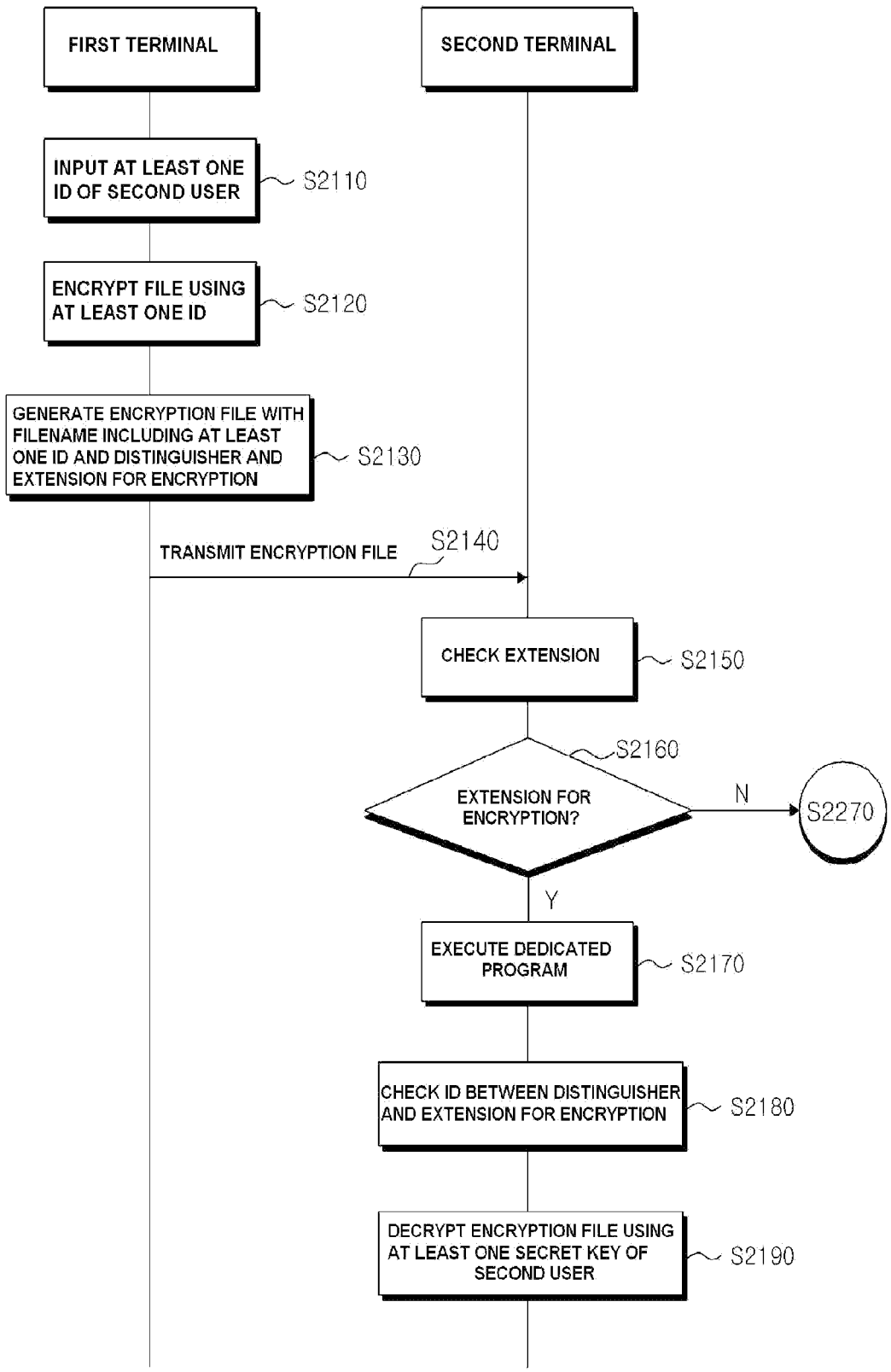
FIG. 29 is a flowchart illustrating an ID-based encryption and decryption method according to an exemplary embodiment of the present disclosure.

FIG. 29 is a flowchart illustrating an ID-based encryption and decryption method according to an exemplary embodiment of the present disclosure.

The ID-based encryption and decryption method of FIG. 29 may be performed by the first terminal 100 and the second terminal 200 described with reference to FIG. 2.

Referring to FIG. 29, the first terminal receives at least one ID of a second user input by a user through an ID input screen (not shown) provided by an ID-based processing module (S2110). In step S2110, when trying to encrypt a first file, a first user who is the user of the first terminal may input or select an ID of the second user who will receive the first file through the ID input screen. Also, when trying to hierarchically encrypt the first file, the first user may input a plurality of IDs of the second user.

Using the at least one ID input in step S2110, the first terminal encrypts the first file (S2120). For example, when a plurality of IDs are input in step S2110, the first terminal may encrypt the first file a first time using an ID of an upper-level group, and encrypt the first file a second time using an ID of a lower-level group.

The first terminal may set the at least one ID of the second user that has been used to encrypt the first file in step S2120, the original filename of the first file, the original extension of the first file, and a distinguisher as a filename of an encryption file, and set the extension for encryption as an extension of the encryption file, thereby generating the encryption file (S2130). The distinguisher enables distinguishing between the original filename of the first file and the ID of the second user used for encryption.

When the first terminal is requested by the first user to transmit the first file, the first terminal may transmit the encryption file whose filename includes the ID of the second user and whose extension is the extension for encryption to the second terminal or a local server shared by the first terminal and the second terminal (S2140).

When the encryption file is received, the second terminal may check the extension of the encryption file (S2150).

When the checked extension is the extension for encryption (S2160-Y), the second terminal may automatically execute a dedicated program set for the extension for encryption (i.e., program for running an ID-based processing module) (S2170).

With the dedicated program, the second terminal may check the at least one ID of the second user interposed between the extension for encryption and the distinguisher in the received encryption file (S2180), and decrypt the encryption file using a secret key paired with the at least one checked ID (S2190). The second user may find that the received file is an encryption file from the visually checked extension for encryption.

Figure 30:
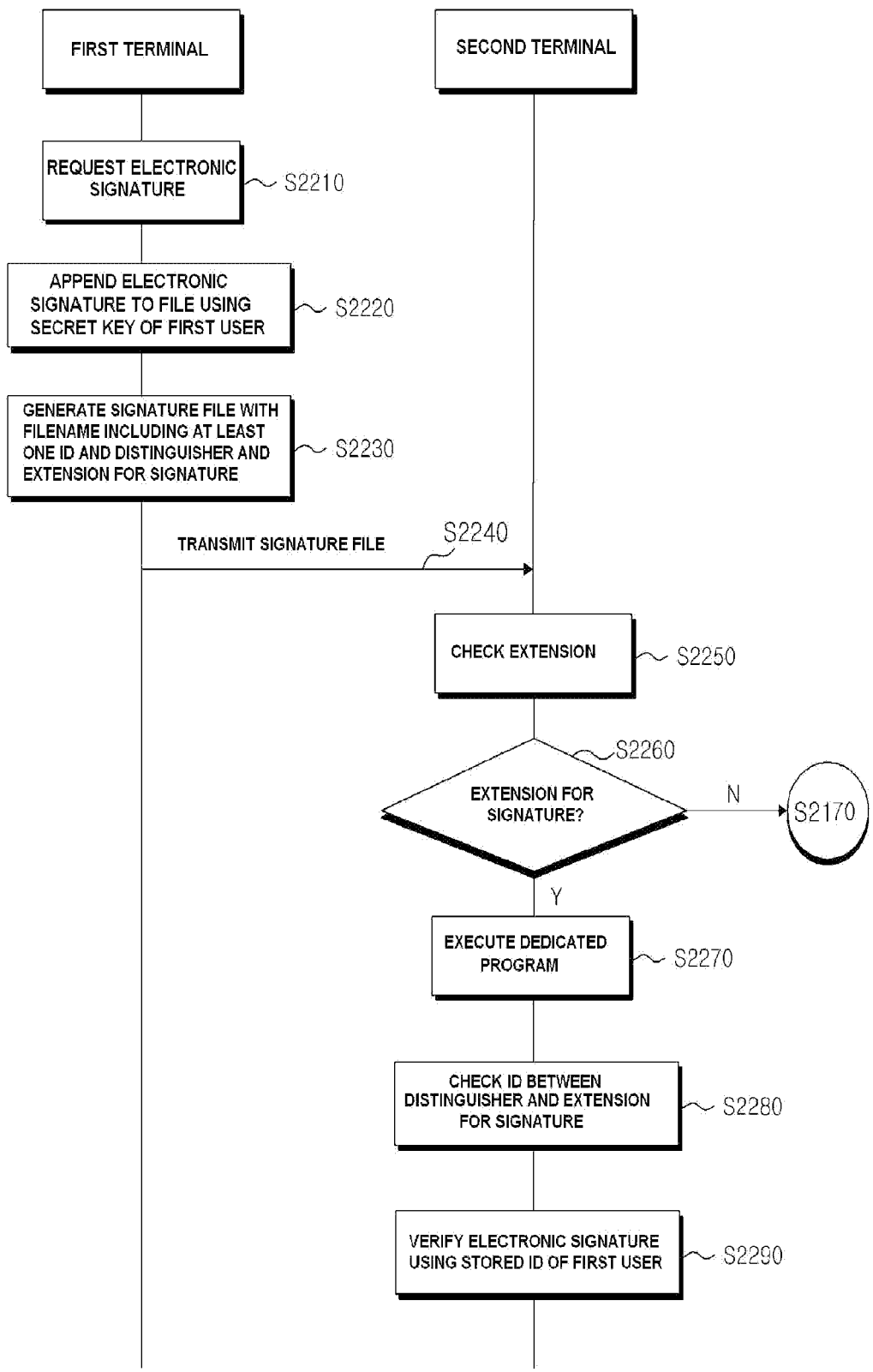
FIG. 30 is a flowchart illustrating an ID-based electronic signature and verification method according to an exemplary embodiment of the present disclosure.

FIG. 30 is a flowchart illustrating an ID-based electronic signature and verification method according to an exemplary embodiment of the present disclosure.

Referring to FIG. 30, a first terminal runs an ID-based processing module, and then is requested by a first user to put an electronic signature to a second file (S2210).

In response to the request of the first user, the first terminal may generate an electronic signature using a secret key corresponding to at least one ID of the first user, and append the electronic signature to the second file (S2220).

The first terminal may set the at least one ID of the first user that has been used in step S2220, the original filename of the second file, the original extension of the second file, and a distinguisher as a filename of a signature file, and set the extension for signature as an extension of the signature file, thereby generating the signature file (S2230). The distinguisher of the signature file enables distinguishing between the original filename of the second file and the ID of the first user used for the electronic signature. The at least one ID of the first user set as a part of the filename of the second file (or signature file) is the ID paired with the at least one secret key of the first user used to generate the electronic signature.

When the first user requests transmission of the second file, the first terminal transmits the signature file to a second terminal (S2240).

When the second file is received, the second terminal checks the extension of the signature file (S2250).

When the checked extension is the extension for signature (S2260-Y), the second terminal may automatically execute a dedicated program associated with the extension for signature (i.e., ID-based processing module) (S2270).

With the dedicated program, the second terminal may check the at least one ID of the first user interposed between the extension for signature and the distinguisher in the received signature file (S2280), and verify the electronic signature of the signature file using the at least one checked ID and a verification algorithm (S2290).

Figure 31:
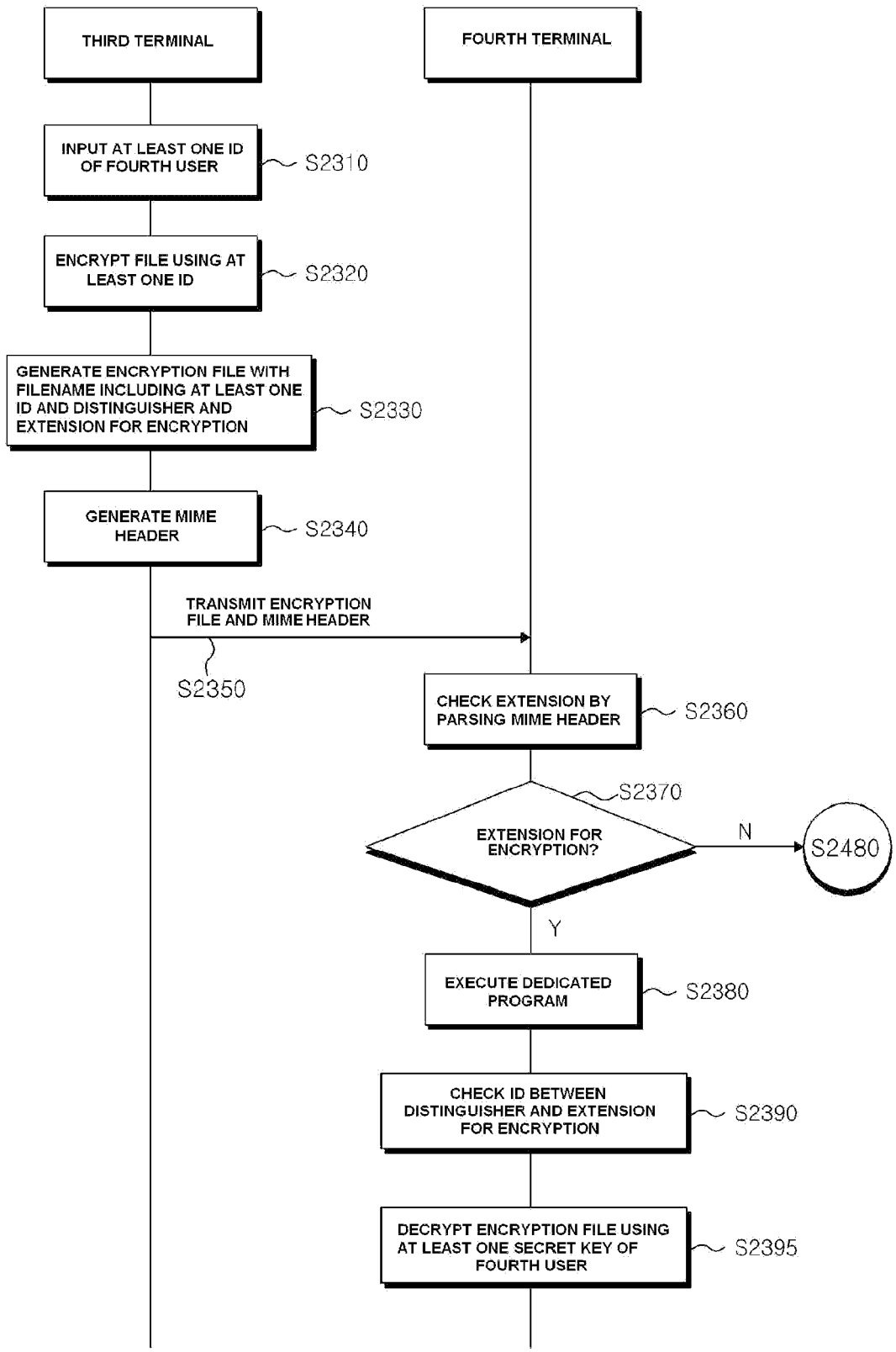
FIG. 31 is a flowchart illustrating an ID-based encryption and decryption method according to another exemplary embodiment of the present disclosure.

FIG. 31 is a flowchart illustrating an ID-based encryption and decryption method according to another exemplary embodiment of the present disclosure.

The ID-based encryption and decryption method of FIG. 31 may be performed by the third terminal 300 and the fourth terminal 400 described with reference to FIG. 17.

Referring to FIG. 31, the third terminal receives at least one ID of a fourth user input by a user through an ID input screen (not shown) provided by an ID-based processing module (S2310).

The third terminal encrypts a first file using the at least one ID input in step S2310 (S2320).

The third terminal may set the at least one ID of the fourth user that has been used to encrypt the first file in step S2320, the original filename of the first file, the original extension of the first file, and a distinguisher as a filename of an encryption file, and set the extension for encryption as an extension of the encryption file, thereby generating the encryption file (S2330).

When transmission of the encryption file through a web environment is requested, the third terminal may generate a MIME header including information indicating that the encryption file has been encrypted (S2340). The MIME header may use the extension for encryption, which is used as an extension of the encryption file, as information indicating that the encryption file has been encrypted, and may have the format described with reference to FIG. 18.

When transmission of the encryption file is requested by the third user, the third terminal may transmit the encryption file and the MIME header to the fourth terminal (S2350).

When the encryption file and the MIME header are received, the fourth terminal may check the extension of the received file by parsing the MIME header (S2360).

When the checked extension is the extension for encryption (S2370-Y), the fourth terminal (e.g., a web browser of the fourth terminal) may automatically execute a dedicated program set for the extension for encryption (i.e., program for running an ID-based processing module) (S2380).

With the dedicated program, the fourth terminal may check the at least one ID of the fourth user interposed between the extension for encryption and the distinguisher in the received encryption file (S2390), and decrypt the encryption file using a secret key paired with the at least one checked ID (S2395).

Figure 32:
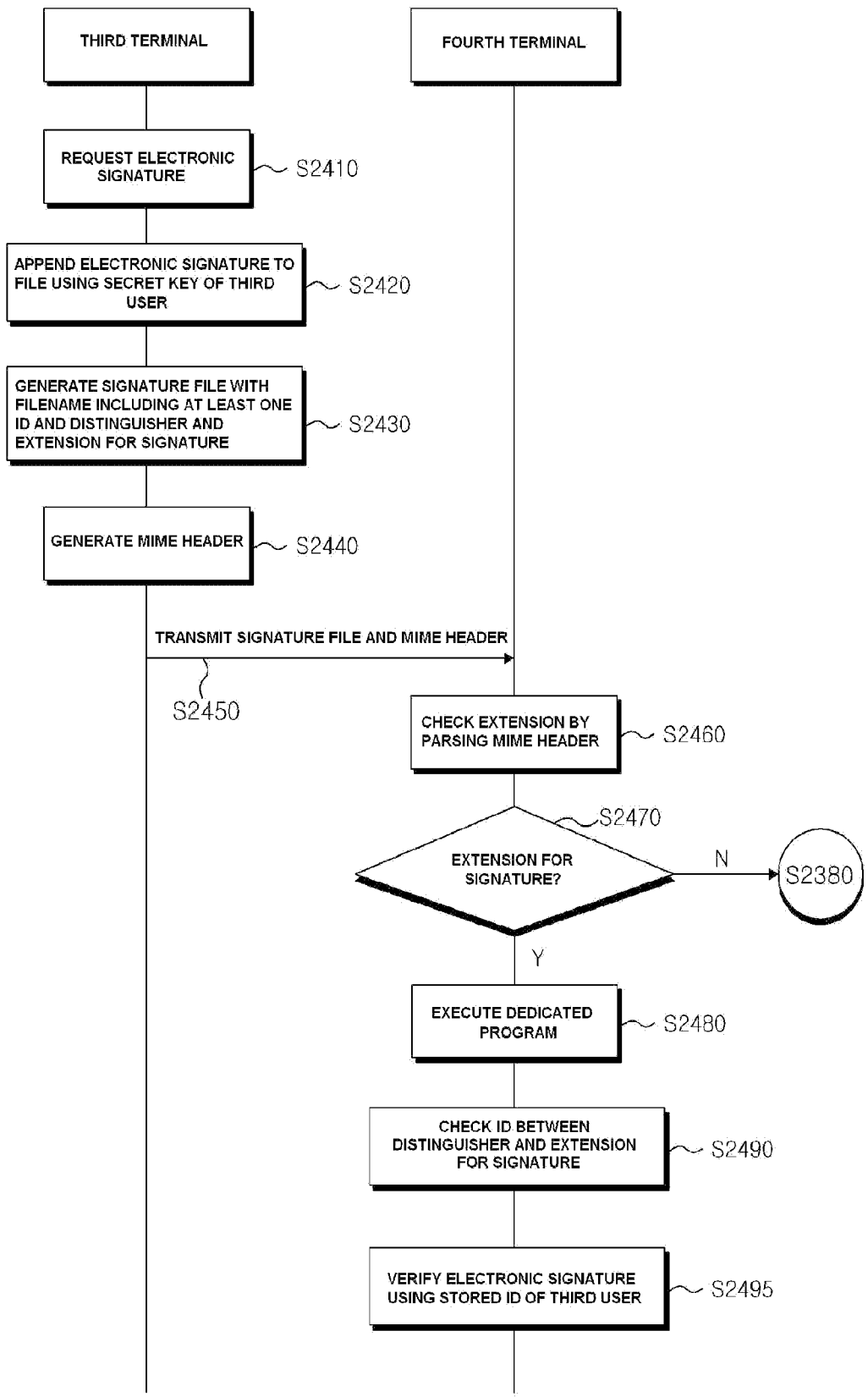
FIG. 32 is a flowchart illustrating an ID-based electronic signature and verification method according to another exemplary embodiment of the present disclosure.

FIG. 32 is a flowchart illustrating an ID-based electronic signature and verification method according to another exemplary embodiment of the present disclosure.

Referring to FIG. 32, a third terminal runs an ID-based processing module, and then is requested by a third user to put an electronic signature to a second file (S2410).

In response to the request of the third user, the third terminal may generate an electronic signature using a secret key corresponding to at least one ID of the third user, and append the electronic signature to the second file (S2420).

The third terminal may set the at least one ID of the third user that has been used in step S2420, the original filename of the second file, the original extension of the second file, and a distinguisher as a filename of a signature file, and set the extension for signature as an extension of the signature file, thereby generating the signature file (S2430).

When transmission of the signature file through a web environment is requested, the third terminal may generate a MIME header including information indicating that an electronic signature has been appended to the signature file (S2440). The MIME header may use the extension for signature, which is used as an extension of the signature file, as the information.

When transmission of the second file is requested by the third user, the third terminal may transmit the signature file and the MIME header to a fourth terminal (S2450).

When the signature file and the MIME header are received, the fourth terminal checks the extension of the received file by parsing the MIME header (S2460).

When the checked extension is the extension for signature (S2470-Y), the fourth terminal may automatically execute a dedicated program associated with the extension for signature (i.e., ID-based processing module) (S2480).

With the dedicated program, the fourth terminal may check the at least one ID of the third user interposed between the extension for signature and the distinguisher in the received signature file (S2490), and verify the electronic signature of the signature file using the at least one checked ID and a verification algorithm (S2495).

Figure 33:
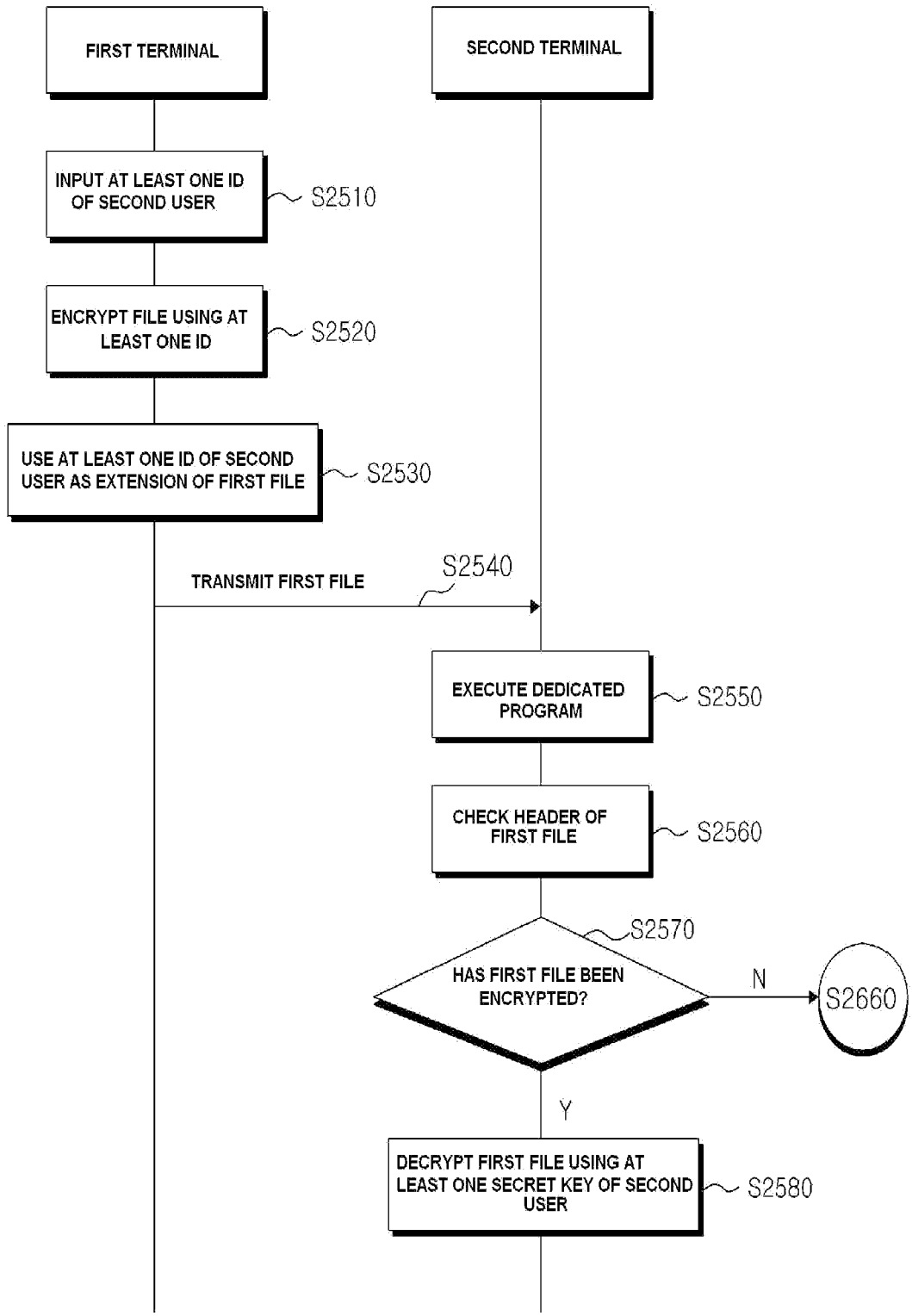
FIG. 33 is a flowchart illustrating an ID-based encryption and decryption method according to still another exemplary embodiment of the present disclosure.

FIG. 33 is a flowchart illustrating an ID-based encryption and decryption method according to still another exemplary embodiment of the present disclosure.

Referring to FIG. 33, a first terminal receives at least one ID of a second user through an ID input screen (e.g., the screen 500 or 600 shown in FIG. 9 or FIG. 10) provided by an ID-based processing module (S2510). When trying to encrypt a first file, a first user may input or select an ID of the second user who will receive the first file through the ID input screen. Also, when trying to hierarchically encrypt the first file, the first user may input a plurality of IDs of the second user. At this time, the second user may denote a group.

Using the at least one ID input in step S2510, the first terminal encrypts the first file (S2520). When a plurality of IDs are input in step S2510, the first terminal may encrypt the first file a first time using an ID of an upper-level group, and encrypt the first file a second time using an ID of a lower-level group.

The first terminal may insert information indicating that the first file has been encrypted in a header of the first file encrypted in step S2520, and use the at least one ID as an extension of the first file (S2530).

When the first terminal is requested by the first user to transmit the first file, the first terminal transmits the encrypted first file whose extension is the ID of the second user to the second terminal (S2540).

When the first file is received, the second terminal checks an associated program set for the extension of the first file, and executes a dedicated program set as the associated program (i.e., program for running an ID-based processing module) (S2550).

The second terminal checks the header of the first file (S2560). When the first file has been encrypted (S2570-Y), the second terminal decrypts the first file using a secret key paired with the at least one ID of the second user (S2580). When the first file has been encrypted using a plurality of IDs of the second user, the second terminal may hierarchically decrypt the first file using respective secret keys paired with the plurality of IDs.

Figure 34:
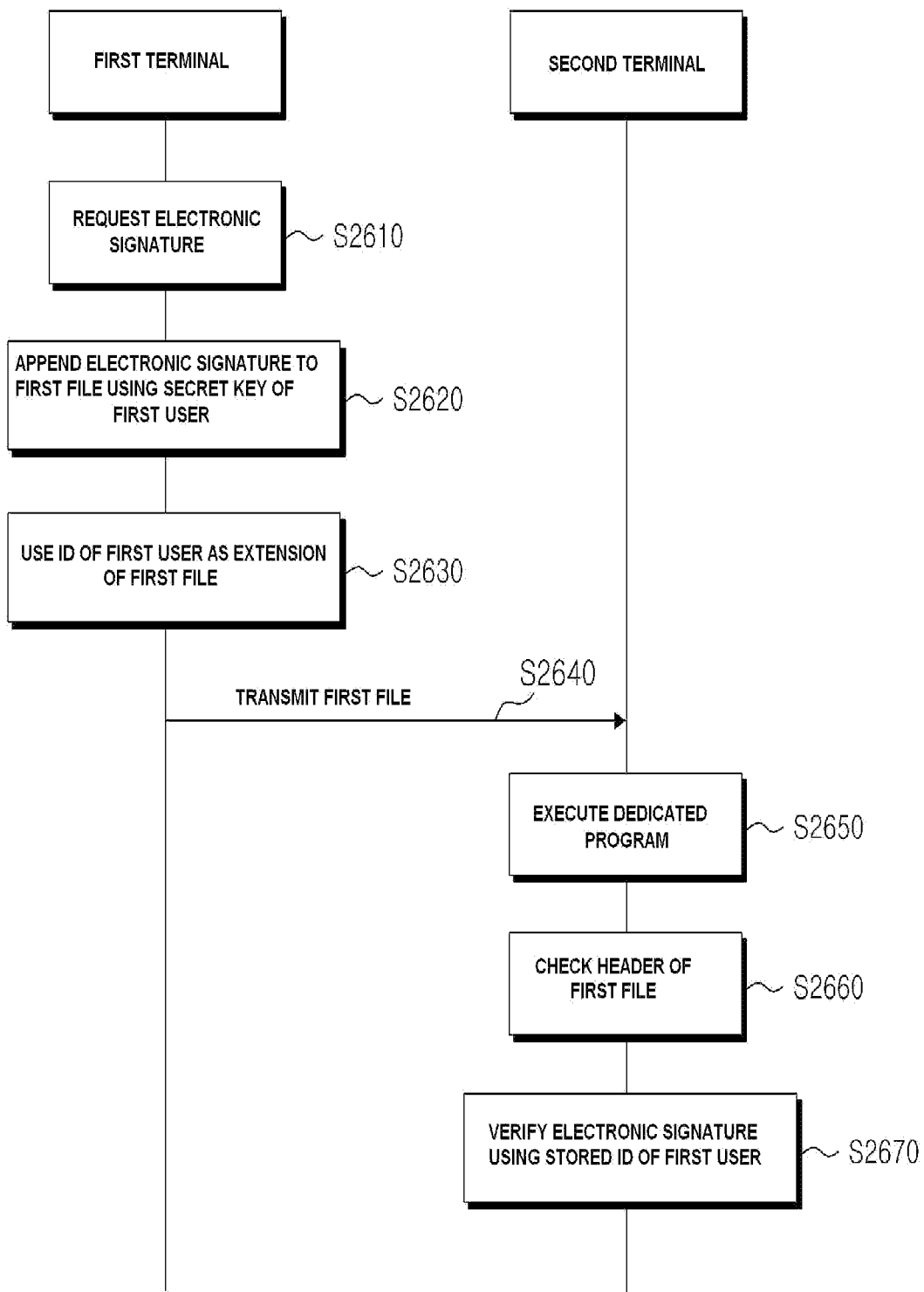
FIG. 34 is a flowchart illustrating an ID-based electronic signature and verification method according to still another exemplary embodiment of the present disclosure.

FIG. 34 is a flowchart illustrating an ID-based electronic signature and verification method according to still another exemplary embodiment of the present disclosure.

Referring to FIG. 34, a first terminal runs an ID-based processing module, and then is requested by a first user to put an electronic signature to a first file (S2610).

In response to the request of the first user, the first terminal may generate an electronic signature using a secret key of the first user provided in step S2610, and append the electronic signature to the first file (S2620).

The first terminal may use an ID of the first user used in step S2620 as an extension of the first file, and insert information indicating that an electronic signature has been appended to the first file in a header of the first file to which the electronic signature has been appended (S2630).

When the first terminal is requested by the first user to transmit the first file, the first terminal transmits the first file whose extension is the ID of the first user and to which the electronic signature has been appended to the second terminal (S2640).

When the first file is received, the second terminal checks an associated program set for the extension of the first file, and executes a dedicated program set as the associated program (S2650).

The second terminal checks the header of the first file (S2660). When an electronic signature has been appended to the first file, the second terminal verifies the validity of the electronic signature using an ID of the first user and the ID of the first user that is the extension of the first file (S2670).

Figure 35:
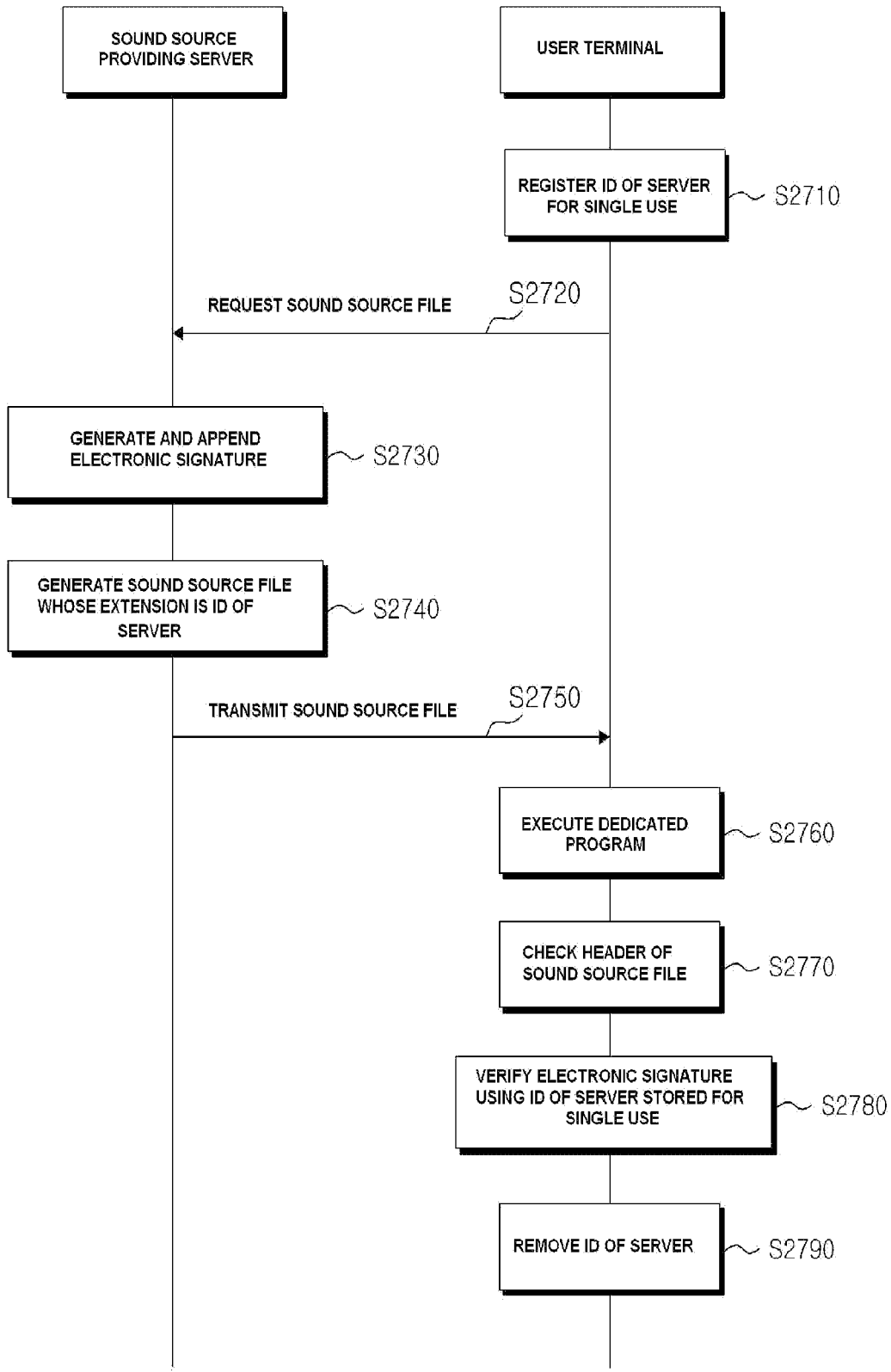
FIG. 35 is a flowchart illustrating an ID-based electronic signature and verification method according to yet another exemplary embodiment of the present disclosure.

FIG. 35 is a flowchart illustrating an ID-based electronic signature and verification method according to yet another exemplary embodiment of the present disclosure.

A sound source providing server and a user terminal of FIG. 35 may correspond to the first terminal 100 and the second terminal 200, respectively.

Referring to FIG. 35, for a single use, the user terminal registers an ID (e.g., "ABC" of FIG. 14) of the sound source providing server that provides a sound source file through a screen provided by an ID-based processing module (S2710). Registration for a single use denotes temporary registration of an ID of a specific server when a user tries to load a file from the specific server. The specific server appends an electronic signature to a file having the ID as an extension and transmits the file to a user terminal such that a user can safely load the desired file.

The user terminal requests a sound source file from the sound source providing server (S2720).

The sound source providing server generates and appends an attachment file to the sound source file requested by a user using a secret key paired with the ID of the sound source providing server (S2730), and uses the ID of the sound source providing server as an extension of the sound source file (S2740).

The sound source providing server transmits the sound source file generated in step S2740 to the user terminal (S2750).

When the sound source file is received, the user terminal executes a dedicated program designated for the extension of the sound source file (S2760).

The user terminal checks a header of the sound source file (S2770), and verifies an electronic signature of the sound source file using the ID registered for a single use in step S2710 (S2780).

When the verification succeeds, the user terminal may remove the ID of the server registered in step S2710, or keep the ID stored according to a user request (S2790).

In the exemplary embodiments of the present disclosure described above, when the OS of the first terminal 100 or the second terminal 200 is Windows series, it is possible to recognize an ID as an extension and set a dedicated program as an associated program of the extension.

On the other hand, according to an OS-specific file system, an extension of a file may be treated more or less as a simple string. In this case, a first ID-based processing module may add metadata to an encrypted file or a file to which an electronic signature has been appended. The metadata has information that allows a second terminal receiving a file to determine an associated program designated for the file. The information of the metadata allows a connection to a dedicated program of the present disclosure according to a policy of each file system.

In addition, in the exemplary embodiments described above, each of a first terminal (or third terminal) and a second terminal (or fourth terminal) may operate as a receiver terminal that receives an encryption file or a file with an electronic signature generated according to an exemplary embodiment of the present disclosure, and/or a transmitter terminal that transmits an encryption file or a file with an electronic signature generated according to an exemplary embodiment of the present disclosure.

Meanwhile, in the exemplary embodiments described above, a first terminal (or third terminal) and a second terminal (or fourth terminal) may include a CPU, a memory, user input/output (I/O) devices (e.g., a mouse, a keyboard, a monitor, etc.), and in this case, the ID-based processing module and the MIME header generator and checker described above may be configured in the form of a program and executed on the memory under the control of the CPU.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

The invention claimed is:

1. A terminal, comprising:
a processor;
a storage, accessible to the processor, configured to hold at least part of a file;
a transmitter configured to transmit the file to a receiver; and
an identity-based (ID-based) processing module, implemented by the processor, and configured to implement at least one pre-transmission file security measure with respect to the file using a component ID of one of the transmitter and the receiver to provide a processed file,
wherein the processed file includes a dedicated file extension to indicate which type of the pre-transmission file security measure is applied to the file, and
wherein the ID-based processing module uses a first extension to indicate that the pre-transmission file security measure is encrypting the file and uses a second extension to indicate that the pre-transmission file security measure is putting an electronic signature to the file.

2. The terminal of claim 1, wherein:
the ID-based processing module is further configured to use the component ID as at least a portion of a file identifier of the processed file; and
the portion of the file identifier is at least one of a part of a filename of the file and an extension of the file.

3. The terminal of claim 2, wherein:
the at least one pre-transmission file security measure is encrypting the file;
the component ID is the receiver ID; and
the ID-based processing module is further configured to use the receiver ID as the portion of the file identifier.

4. The terminal of claim 2, wherein:
the at least one pre-transmission file security measure is putting the electronic signature to the file using a secret key corresponding to the component ID;
the component ID is the transmitter ID; and
the ID-based processing module is further configured to use the component ID as the portion of the file identifier.

5. The terminal of claim 2, wherein:
the component ID comprises a plurality of respective receiver IDs; and
the ID-based processing module is further configured to use the plurality of respective receiver IDs as the portion of the file identifier.

6. The terminal of claim 5, wherein the ID-based processing module is further configured to:
implement the pre-transmission file security measure in a hierarchical manner using the plurality of respective receiver IDs in sequence; and
insert information indicating the pre-transmission file security measure in a header of the processed file.

7. The terminal of claim 5, wherein the ID-based processing module is configured to use the first extension of the file identifier, which is a corporate identifier, to indicate that the pre-transmission file security measure is encrypting the file and to use the second extension of the file identifier to indicate that the pre-transmission file security measure is putting the electronic signature to the file.

8. The terminal of claim 1, wherein:
the at least one pre-transmission file security measure is encrypting the file;
the component ID is the receiver ID; and
the ID-based processing module is further configured to implement the encrypting of the file using the receiver ID as a public key.

9. The terminal of claim 1, wherein:
the at least one pre-transmission file security measure is putting the electronic signature to the file;
the component ID is the transmitter ID; and
the ID-based processing module is further configured to implement the putting of the electronic signature to the file using a secret key corresponding to the transmitter ID.

10. The terminal of claim 1, wherein, the ID-based processing module is further configured to insert information indicating the pre-transmission file security measure in a header of the processed file.

11. The terminal of claim 1, wherein:
the component ID is the receiver ID;
the pre-transmission file security measure is encrypting the file; and
the ID-based processing module is further configured to set a respective name of the processed file using an original filename of the file, an original extension of the file, a distinguisher, and the component ID;
wherein the distinguisher distinguishes between the original filename of the file and the component ID.

12. The terminal of claim 1, wherein the storage is further configured to store at least one receiver ID, at least one transmitter ID, and at least one secret key respectively corresponding to the at least one transmitter ID.

13. The terminal of claim 12, wherein:
when the pre-transmission file security measure is encrypting the file, the ID-based processing module is further configured to encrypt the file using the at least one receiver ID as a public key; and
when the pre-transmission file security measure is putting the electronic signature to the file, the ID-based processing module is further configured to use a secret key corresponding to the at least one transmitter ID.

14. The terminal of claim 1, wherein the ID-based processing module is further configured to implement two different pre-transmission file security measures, in sequence, with respect to the file, including, in any order:
encrypting using the receiver ID as a public key, and
putting the electronic signature using a secret key corresponding to the transmitter ID.

15. The terminal of claim 1, further comprising a Multipurpose Internet Message Extensions (MIME) header generator configured to generate a MIME header including information indicating the pre-transmission file security measure taken with respect to the file, wherein the MIME header is transmitted by the transmitter together with the processed file.

16. A terminal, comprising:
a processor;
a storage, accessible to the processor, configured to hold at least part of a received file;
a receiver configured to receive the received file from a transmitter; and
an identity-based (ID-based) processing module, implemented by the processor, and configured to implement at least one post-reception file security measure with respect to the received file to generate a finished file using a component ID, of one of the transmitter and the receiver, provided in at least a portion of a file identifier of the received file,
wherein the received file includes a dedicated file extension to indicate which type of pre-transmission file security measure is applied to the file, and
wherein the ID-based processing module responds to detecting a first file extension in the file identifier of the received file by decrypting the received file, using a secret key corresponding to the receiver ID, as the post-reception file security measure, and responds to detecting a second file extension in the file identifier of the received file by verifying an electronic signature of the received file, using the transmitter ID, as the post-reception file security measure.

17. The terminal of claim 16, wherein:
the at least one post-reception file security measure is decrypting the received file;
the component ID is the receiver ID; and
the ID-based processing module is configured to decrypt the received file using the secret key corresponding to the receiver ID, and to use a distinguisher which distinguishes between an original filename of the file and the component ID.

18. The terminal of claim 16, wherein:
the at least one post-reception file security measure is verifying the electronic signature of the received file;
the component ID is the transmitter ID; and
the ID-based processing module is configured to verify the electronic signature using the transmitter ID, and to use a distinguisher which distinguishes between an original filename of the file and the component ID.

19. The terminal of claim 16, wherein the ID-based processing module is further configured to make a determination as to whether the received file has been previously processed with a pre-transmission file security measure by checking a header pertaining to the received file.

20. The terminal of claim 16, wherein the ID-based processing module is further configured to respond, to detecting in the file identifier a plurality of receiver IDs, by decrypting the received file in a hierarchical manner using secret keys respectively corresponding to the plurality of receiver IDs, in sequence.

21. The terminal of claim 16, wherein the ID-based processing module is further configured to respond, to detecting in the file identifier a plurality of transmitter IDs, by verifying the electronic signature of the file using the plurality of transmitter IDs in sequence.

22. The terminal of claim 16, wherein the ID-based processing module is further configured to implement two post-reception file security measures in sequence with respect to the received file, including, in any order:
decrypting the received file using a secret key corresponding to the receiver ID; and
verifying the electronic signature using the transmitter ID.

23. The terminal of claim 16, further comprising a Multipurpose Internet Message Extensions (MIME) header checker configured to check a MIME header, pertaining to the received file, for information indicating a pre-transmission file security measure used with respect to the received file;
wherein:
when the MIME header checker detects information indicating that the pre-transmission file security measure was encryption, the ID-based processing module responds by decrypting the received file using a secret key corresponding to the receiver ID; and
when the MIME header checker detects information indicating that the pre-transmission file security measure was putting the electronic signature, the ID-based processing module responds by verifying the electronic signature using the transmitter ID.

24. An identity (ID)-based encryption and signature method, comprising:
implementing at least one pre-transmission file security measure with respect to a file, using a component ID, to provide a processed file;

wherein the at least one pre-transmission file security measure is one of encrypting the file, and putting an electronic signature to the file;

wherein the component ID is one of a transmitter ID and a receiver ID;

wherein the implementing of the at least one pre-transmission file security measure is performed using a hardware processor, wherein the processed file includes a dedicated file extension to indicate which type of the pre-transmission file security measure is applied to the file, and wherein the implementing comprises generating a file identifier of the processed file including a first extension when the pre-transmission file security measure is the encrypting of the file, and including a second extension when the pre-transmission file security measure is the putting of the electronic signature to the file.

25. The ID-based encryption and signature method of claim 24, further comprising using the component ID as at least a portion of the file identifier of the file.

26. The ID-based encryption and signature method of claim 24, wherein the at least one pre-transmission file security measure is the encrypting of the file, and the component ID is the receiver ID used as a public key.

27. The ID-based encryption and signature method of claim 24, wherein:
component ID is the transmitter ID; and
the at least one pre-transmission file security measure is the putting of the electronic signature to the file using a secret key corresponding to the transmitter ID.

28. The ID-based encryption and signature method of claim 24, further comprising:
generating a header for the processed file; and
inserting information in the header indicating the pre-transmission file security measure taken with respect to the file.

29. The ID-based encryption and signature method of claim 24, wherein:
the generating of the file identifier for the processed file further comprises setting an original filename of the processed file, an original extension of the processed file, a distinguisher, and the receiver ID as a filename of the encrypted file; and
the distinguisher distinguishes between the original filename and the receiver ID.

30. The ID-based encryption and signature method of claim 24, further comprising, when the receiver ID is plural in number, using the plurality of IDs as the at least a portion of the file identifier.

31. The ID-based encryption and signature method of claim 30, further comprising:
implementing the file security measure hierarchically using the plurality of IDs in sequence; and
inserting information in a header of the processed file indicating the implemented pre-transmission file security measure.

32. The ID-based encryption and signature method of claim 30, further comprising:
implementing the pre-transmission file security measure hierarchically using the plurality of IDs in sequence; and
generating the file identifier of the processed file including the first extension when the pre-transmission file security measure is the encrypting of the file, and including the second extension when the pre-transmission file security measure is the putting of the electronic signature to the file.

33. The ID-based encryption and signature method of claim 24, wherein the implementing of the pre-transmission file security measure is performed so that two sequential pre-transmission file security measures are performed with respect to the file, including, in any order:
encrypting the file using the receiver ID as a public key; and
putting the electronic signature to the encrypted file using a secret key corresponding to the transmitter ID.

34. The ID-based encryption and signature method of claim 24, further comprising:
generating a Multipurpose Internet Message Extensions (MIME) header including information indicating the pre-transmission file security measure; and
transmitting the MIME header together with the processed file.

35. The ID-based encryption and signature method of claim 24, further comprising:
receiving a processed file as a received file; and
implementing a post-reception file security measure with respect to the received file to provide a finished file;
wherein:
the at least one post-reception file security measure includes one of decrypting the received file, and verifying the electronic signature of the received file; and
when at least a portion of the file identifier of the received file includes the component ID, the post-reception file security measure is implemented using the component ID.

36. The ID-based encryption and signature method of claim 35, wherein, when the at least one post-reception file security measure is the decrypting of the received file and the component ID is the receiver ID, a secret key corresponding to the receiver ID is used in the decrypting.

37. The ID-based encryption and signature method of claim 35, wherein, when the at least one post-reception file security measure is the verifying of the electronic signature of the received file and the component ID is the transmitter ID, the transmitter ID is used in the verifying.

38. The ID-based encryption and signature method of claim 35, further comprising:
receiving a header pertaining to the received file;
determining, based on the header, one or more pre-transmission file security measures previously implemented with respect to the received file.

39. The ID-based encryption and signature method of claim 35, further comprising:
checking an extension of the received file;
when the extension is the first extension, decrypting the received file using a secret key corresponding to the receiver ID;
when the extension is the second extension, verifying the electronic signature of the received file using the transmitter ID.

40. The ID-based encryption and signature method of claim 35, further comprising:
the portion of the file identifier of the received file including the receiver ID, in plural, as the component ID;
responding to the presence of the receiver ID in plural by hierarchically decrypting the received file using secret keys, respectively corresponding to the plurality of receiver IDs, in sequence.

41. The ID-based encryption and signature method of claim 35, further comprising:
the portion of the file identifier of the received file including the transmitter ID, in plural, as the component ID;

responding to the presence of the transmitter ID in plural by verifying the electronic signature of the received file using the plurality of transmitter IDs in sequence.

42. The ID-based encryption and signature method of claim 35, wherein:
  when the at least one pre-transmission file security measure implemented with respect to the received file includes the encrypting and then the putting of the electronic signature to the encrypted file, the at least one post-reception file security measure includes:
    verifying the electronic signature using the transmitter ID, and then
    decrypting using a secret key corresponding to the receiver ID; and
  when the at least one pre-transmission file security measure implemented with respect to the received file includes the putting of the electronic signature to the file and then the encrypting the file with the electronic signature, the at least one post-reception file security measure includes:
    decrypting using the secret key corresponding to the receiver ID, and then
    verifying the electronic signature using the transmitter ID.

43. The ID-based encryption and signature method of claim 35, further comprising:
  receiving a MIME header pertaining to the received file; and
  implementing the post-reception file security measure based on an indication included the MIME header.

44. A terminal, comprising:
  a processor;
  a storage, accessible to the processor, configured to hold at least part of a file;
  a transmitter configured to transmit the file to a receiver; and
  an identity-based (ID-based) processing module, implemented by the processor, and configured to implement a pre-transmission file security measure with respect to the file to provide a processed file;
  wherein the pre-transmission file security measure is implemented using at least a portion of a file identifier of the processed file,
  wherein the processed file includes a dedicated file extension to indicate which type of the pre-transmission file security measure is applied to the file, and
  wherein the ID-based processing module uses a first extension to indicate that the pre-transmission file security measure is encrypting the file and uses a second extension to indicate that the pre-transmission file security measure is putting an electronic signature to the file.

45. The terminal of claim 44, wherein the ID-based processing module is further configured to generate the file identifier of the processed file using a component ID of at least one of the transmitter and the receiver.

46. A terminal, comprising:
  a processor;
  a storage, accessible to the processor, configured to hold at least part of a received file;
  a receiver configured to receive the received file from a transmitter; and
  an identity-based (ID-based) processing module, implemented by the processor, and configured to implement at least one post-reception file security measure with respect to the received file to provide a finished file;
  wherein the post-reception file security measure is implemented using at least a portion of a file identifier of the received file,
  wherein the received file includes a dedicated file extension to indicate which type of pre-transmission file security measure is applied to the file, and
  wherein the ID-based processing module responds to detecting a first file extension in the file identifier of the received file by decrypting the received file, using a secret key corresponding to the receiver ID, as the post-reception file security measure, and responds to detecting a second file extension in the file identifier of the received file by verifying an electronic signature of the received file, using the transmitter ID, as the post-reception file security measure.

47. The terminal of claim 46, wherein the portion of the file identifier of the received file is a component ID of one of the transmitter and the receiver.

* * * * *